(12) United States Patent
Noguchi et al.

(10) Patent No.: US 10,845,916 B2
(45) Date of Patent: *Nov. 24, 2020

(54) DISPLAY DEVICE

(71) Applicant: Japan Display Inc., Tokyo (JP)

(72) Inventors: Koji Noguchi, Kanagawa (JP); Takeya Takeuchi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,708

(22) Filed: Aug. 5, 2019

(65) Prior Publication Data

US 2019/0354231 A1 Nov. 21, 2019

Related U.S. Application Data

(63) Continuation of application No. 15/944,362, filed on Apr. 3, 2018, now Pat. No. 10,372,262, which is a continuation of application No. 14/839,519, filed on Aug. 28, 2015, now Pat. No. 9,965,082, which is a continuation of application No. 13/754,316, filed on (Continued)

(30) Foreign Application Priority Data

Sep. 16, 2008 (JP) .................................. 2008-236931

(51) Int. Cl.
*G06F 3/041* (2006.01)
*G06F 1/16* (2006.01)
*G06F 3/044* (2006.01)

(52) U.S. Cl.
CPC .............. *G06F 3/0416* (2013.01); *G06F 1/16* (2013.01); *G06F 3/041* (2013.01); *G06F 3/044* (2013.01); *G06F 3/0412* (2013.01)

(58) Field of Classification Search
CPC .......... G06F 1/16; G06F 3/041; G06F 3/0412; G06F 3/0416; G06F 3/044
See application file for complete search history.

(56) References Cited

U.S. PATENT DOCUMENTS 4,733,370 A 3/1988 Kitajima et al.
4,890,096 A 12/1989 Taguchi
(Continued)

FOREIGN PATENT DOCUMENTS

JP 59-216177 6/1984
JP 06-250786 9/1994
(Continued)

OTHER PUBLICATIONS

Hasayashi, et al., "Optical Sensor Embedded Input Display Usable Under High-Ambient-Light Conditions", SID-2007 Digest pp. 1105.
(Continued)

*Primary Examiner* — Mark Fischer
(74) *Attorney, Agent, or Firm* — K&L Gates LLP

(57) ABSTRACT

A display device includes pixels arranged in first and second directions; a contact responding section including driving electrodes extending in the first direction; a driving scanning section; detecting lines extending in the second direction; and a detecting section, wherein the detecting section identifies the position in which the object to be detected is in contact or in proximity on a basis of a pattern of the voltage change of the detecting lines, the pattern of the voltage change occurring according to a difference in the manner of the intersecting between the detecting lines and the driving electrodes.

6 Claims, 18 Drawing Sheets

Related U.S. Application Data

Jan. 30, 2013, now Pat. No. 9,152,259, which is a continuation of application No. 12/550,105, filed on Aug. 28, 2009, now Pat. No. 8,970,505.

(56) References Cited

U.S. PATENT DOCUMENTS

| | | |
|---|---|---|
| 5,581,274 A | 12/1996 | Tagawa |
| 5,907,314 A | 5/1999 | Negishi et al. |
| 6,239,788 B1 | 5/2001 | Noho et al. |
| 7,053,886 B2 | 5/2006 | Shin |
| 7,436,395 B2 | 10/2008 | Chiu et al. |
| 8,654,083 B2 | 2/2014 | Hotelling et al. |
| 9,152,259 B2 | 10/2015 | Noguchi |
| 2003/0014674 A1 | 1/2003 | Huffman |
| 2003/0016210 A1 | 1/2003 | Soto |
| 2006/0097991 A1 | 5/2006 | Hotelling et al. |
| 2007/0190511 A1 | 8/2007 | Ernst |
| 2007/0236466 A1 | 10/2007 | Hotelling et al. |
| 2008/0006453 A1 | 1/2008 | Hotelling |
| 2008/0042992 A1 | 2/2008 | Kim |
| 2008/0062140 A1 | 3/2008 | Hotelling |
| 2008/0158167 A1 | 7/2008 | Hotelling et al. |
| 2008/0158175 A1 | 7/2008 | Hotelling et al. |
| 2008/0162997 A1 | 7/2008 | Vu et al. |
| 2009/0189867 A1 | 7/2009 | Krah |
| 2009/0194344 A1 | 8/2009 | Harley et al. |

FOREIGN PATENT DOCUMENTS

| | | |
|---|---|---|
| JP | 07-319612 | 8/1995 |
| JP | 07-239747 | 9/1995 |
| JP | 08-179871 | 7/1996 |
| JP | 08297267 | 11/1996 |
| JP | 09-292950 | 11/1997 |
| JP | 11-305932 | 11/1999 |
| JP | 2008-009750 | 1/2008 |
| JP | 2008-058925 | 3/2008 |
| JP | 2007-225875 | 6/2012 |
| WO | 2007012256 | 2/2007 |

OTHER PUBLICATIONS

You et al., "12.1-incy a Si:H TFT LCD with Embedded Touch Screen Panel", SID 2008 Digest pp. 830.

Lee et al., "Hybrid Touch Screen Panel Integrated in TFT LCD", SID 2008 Digest, pp. 834.

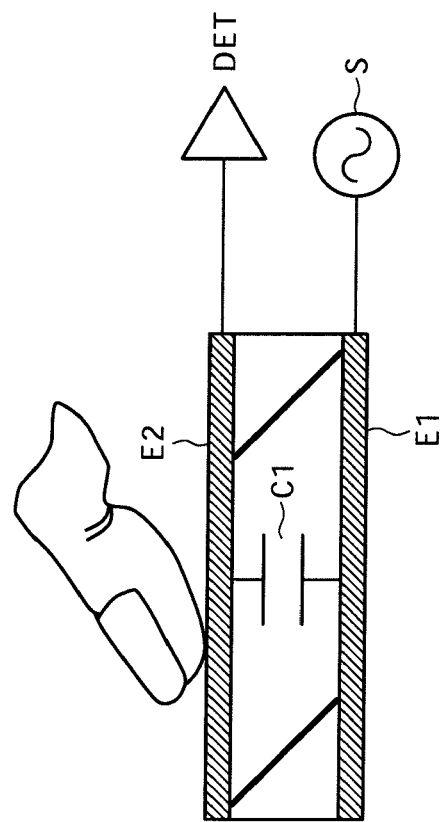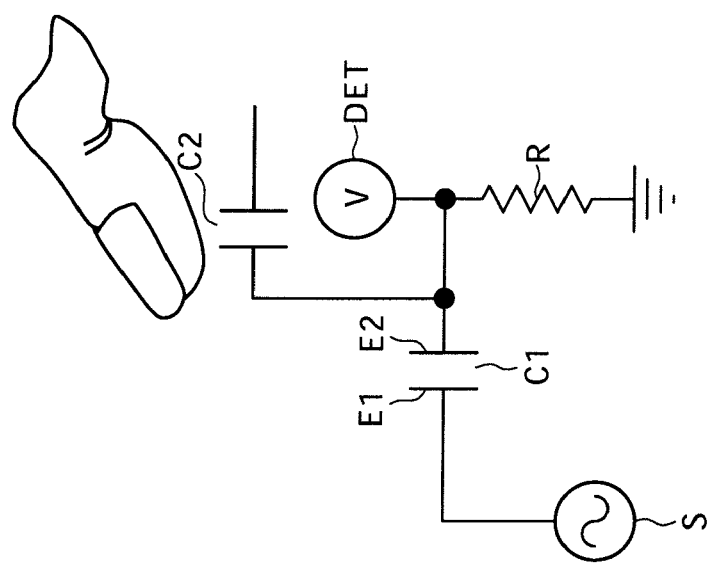

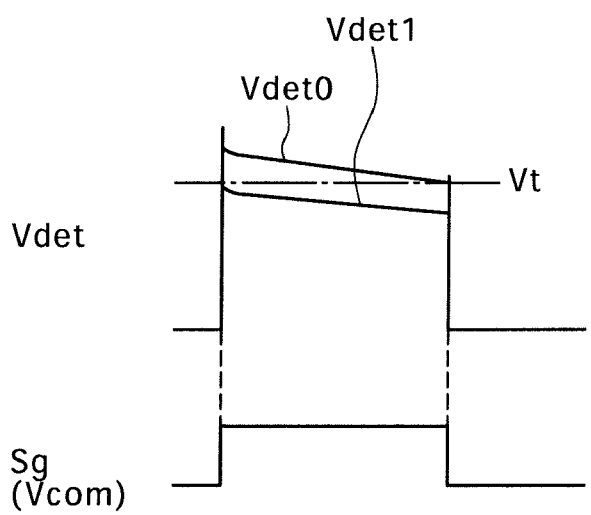
FIG. 3A
FIG. 3B
FIG. 3C
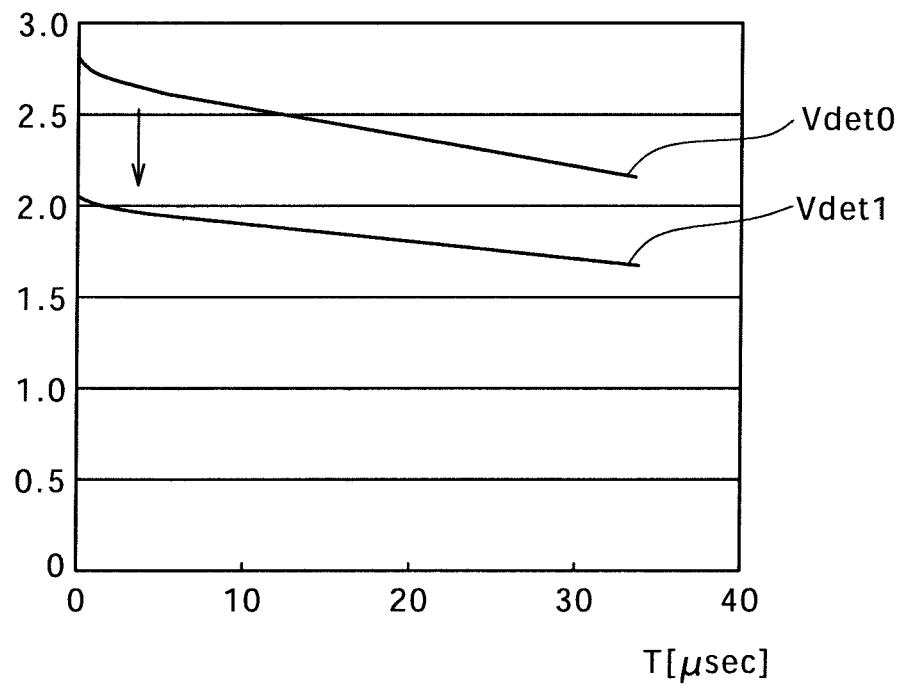

FIG. 5
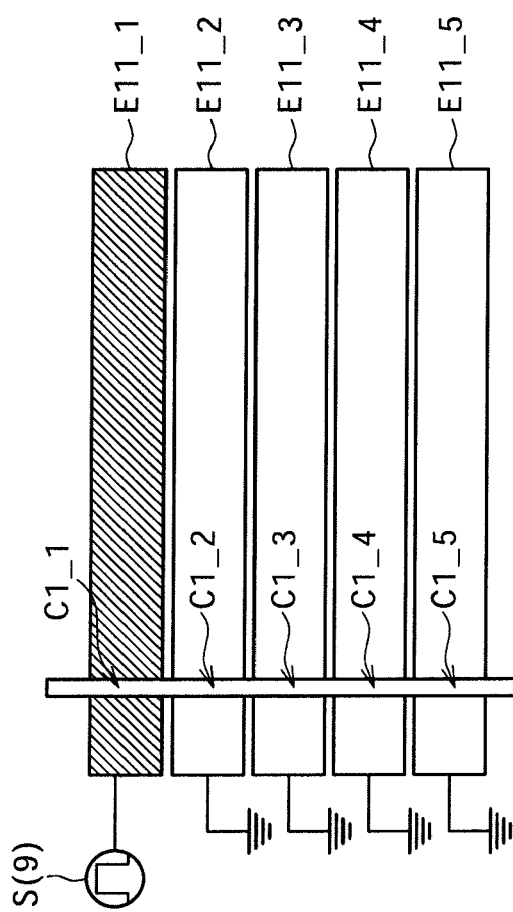
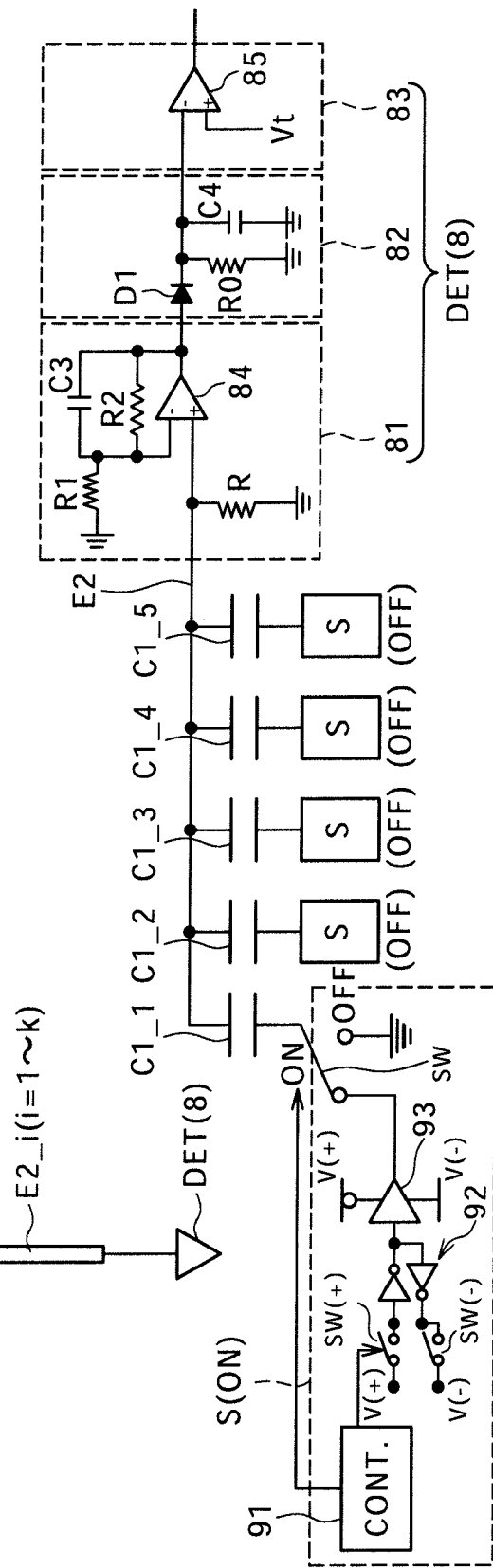

FIG. 15C  $Vs = V1 \times \dfrac{Cp}{nCp + Cc}$

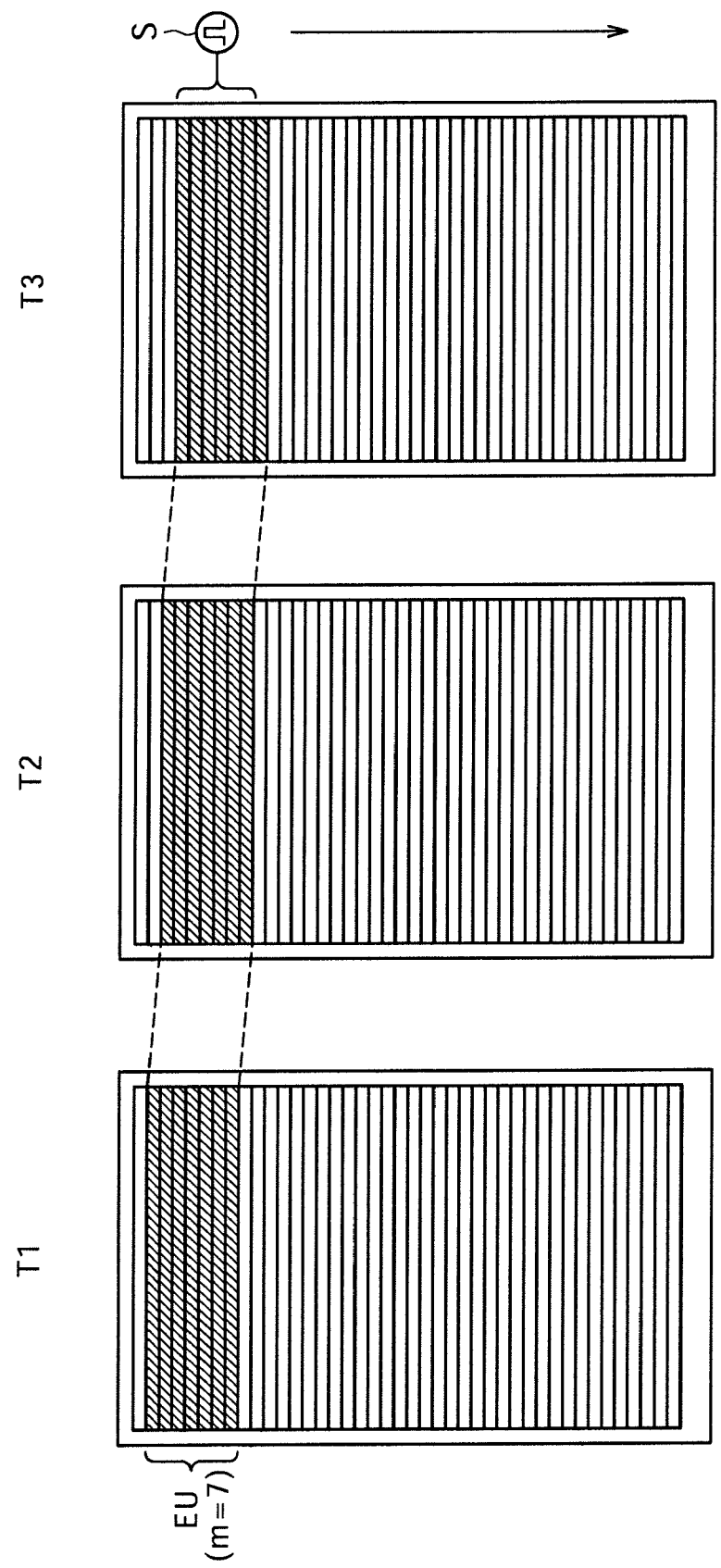

FIG.17
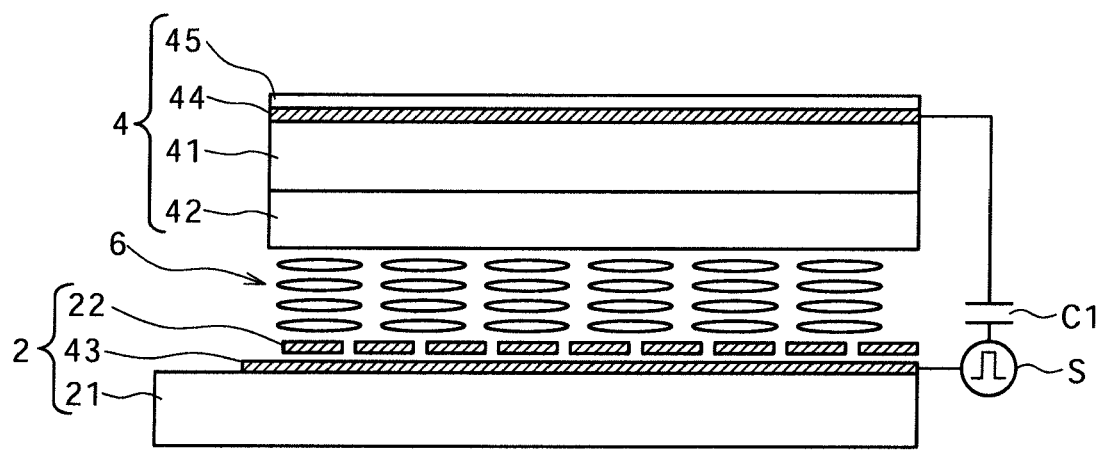
FIG.18A
BLACK DISPLAY
FIG.18B
WHITE DISPLAY
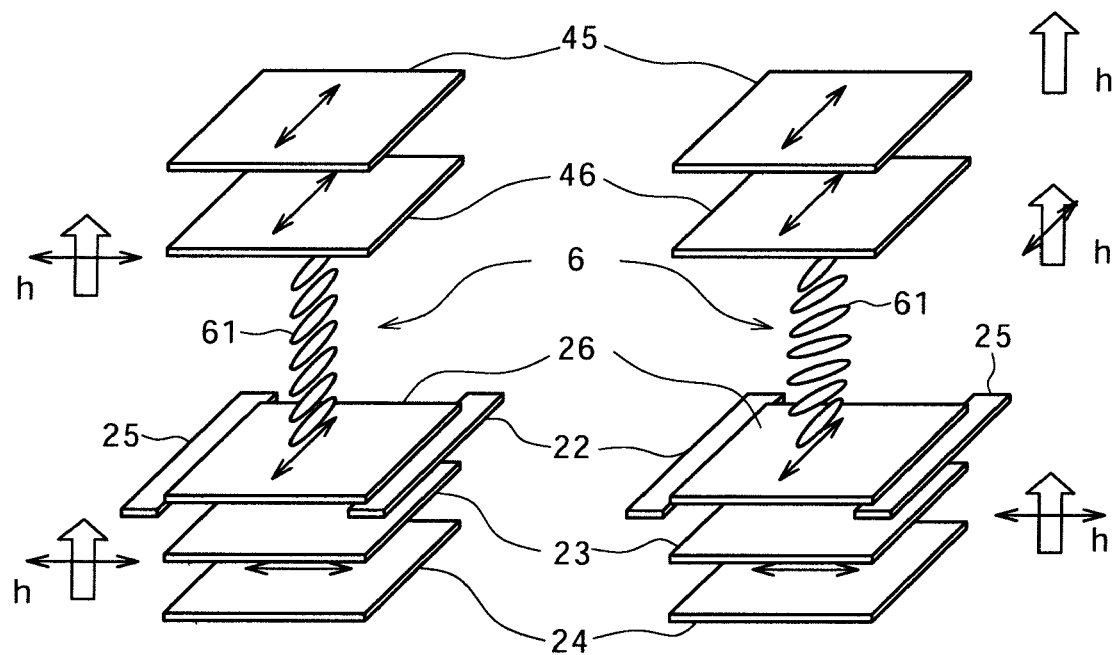

F I G . 1 9 A
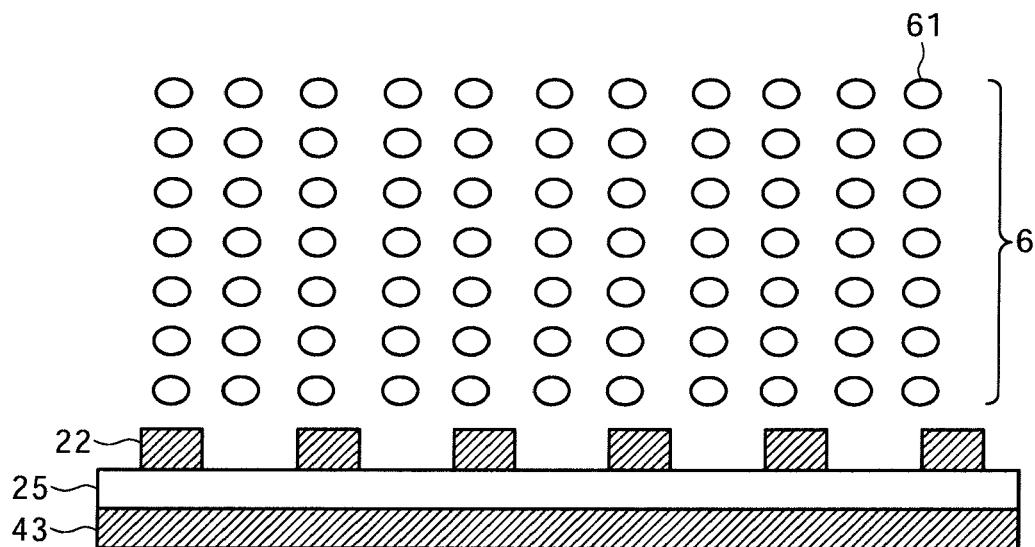
F I G . 1 9 B
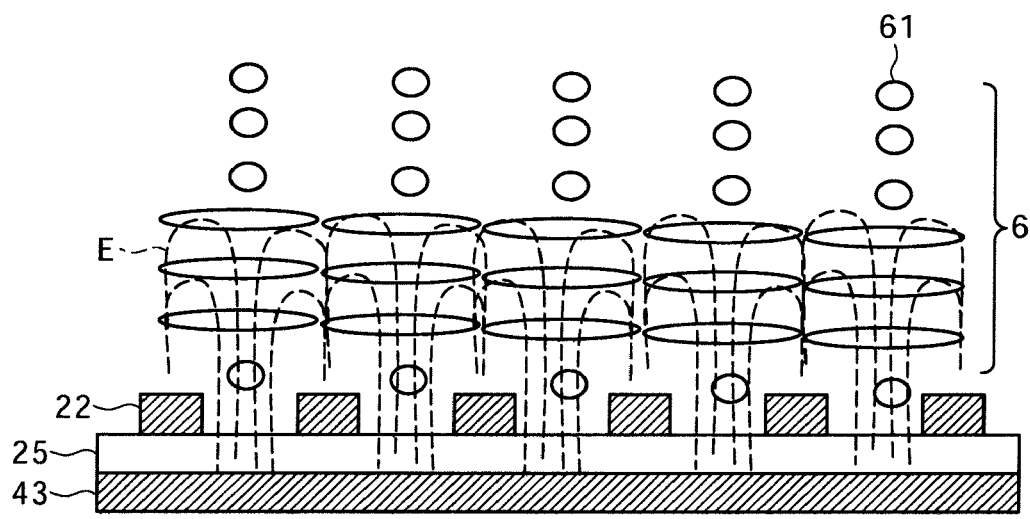

DISPLAY DEVICE

CROSS REFERENCES TO RELATED APPLICATIONS

The present application is a continuation of U.S. patent application Ser. No. 15/944,362, filed on Apr. 3, 2018, which application is a continuation of U.S. patent application Ser. No. 14/839,519, filed on Aug. 28, 2015, and issued as U.S. Pat. No. 9,965,082 on May 8, 2018, which application is a continuation of U.S. patent application Ser. No. 13/754,316, filed on Jan. 30, 2013, and issued as U.S. Pat. No. 9,152,259 on Oct. 6, 2015, which application is a continuation of U.S. patent application Ser. No. 12/550,105, filed on Aug. 28, 2009, and issued as U.S. Pat. No. 8,970,505 on Mar. 3, 2015, which claims priority to Japanese Patent Application JP 2008-236931 filed in the Japanese Patent Office on Sep. 16, 2008, the entire contents of which are incorporated herein by reference.

BACKGROUND OF THE INVENTION

Field of the Invention

The present invention relates to a contact detecting device detecting that a user brings a finger, a pen or the like into contact with or proximity to a detecting surface. The present invention also relates to a display device having functions of the contact detecting device within a display section.

Description of the Related Art

A contact detecting device referred to as a so-called touch panel is known.

The contact detecting device is generally a device detecting that a finger of a user, a pen or the like comes into contact with or proximity to a detecting surface.

On the other hand, the touch panel is formed on a display panel, and enables information input as a substitute for ordinary buttons by making various buttons displayed as an image on a display surface. Application of this technology to a small mobile device enables a display and a button arrangement to be shared, and provides great advantages of increasing the size of the screen or saving the space of an operating section and reducing the number of parts.

Thus, the "touch panel" generally refers to a panel-shaped contact detecting device combined with a display device.

Three contact detecting systems of the touch panel are known, which are an optical type, a resistive film type, and a capacitance type.

To associate an electric change occurring in response to contact or proximity with positional information needs a large number of pieces of wiring combined so as to enable position identification and arranged in the form of a matrix.

To increase the resolution of detection by a manner of position detection with this wiring combination needs an enormous number of pieces of wiring.

Thus, in the three detecting systems mentioned above, a driving method that detects a contact position or a proximity position while scanning lines that output an electric change in one direction is becoming mainstream (see Hirotaka Hayashi etc., "Optical Sensor Embedded Input Display Usable under High-Ambient-Light Conditions," SID 07 DIGEST p. 1105 (optical type), Bong Hyun You etc., "12.1-inch a-Si:H TFT LCD with Embedded Touch Screen Panel," SID 08 DIGEST p. 830 (resistive film type), and Joohyung Lee etc., "Hybrid Touch Screen Panel Integrated in TFT-LCD," SID 08 DIGEST p. 834 (capacitance type), hereinafter referred to as Non-Patent Documents 1 to 3, respectively, for example). A line in this case refers to a row in an X-direction or a Y-direction of minute sensor parts arranged two-dimensionally by a predetermined rule for contact detection.

When the touch panel is provided on the display panel, the thickness of a display module as a whole is increased.

Accordingly, the mainstream of developed types has recently changed from a touch panel mounted onto a display panel to a touch panel included within a display panel (see the above Non-Patent Documents 1 to 3 and Japanese Patent Laid-Open No. 2008-9750).

A "display device provided with a touch sensor" will hereinafter be used as a designation regardless of whether the touch panel is mounted onto a display panel or whether the touch panel is formed integrally with the display panel.

SUMMARY

The driving method of driving a contact detecting device in each line requires high-speed scanning of lines along one or both of an X-axis direction and a Y-axis direction. The contact detecting device thus has a very high driving frequency or the like and involves very high power consumption or the like, which is to be remedied.

On the other hand, in a display device provided with a touch sensor as a combination of a display device and a contact detecting device, in particular, detection driving frequency may be limited by display driving frequency, and thus the detection driving frequency may not be able to be determined freely.

The inventor of the present application has proposed a technique for reducing the thickness of a display device by using a pixel electrode for liquid crystal display also as one detecting electrode of a capacitance detection system (see Japanese Patent Application No. 2008-104079, for example); In this case, display driving frequency and detection driving frequency coincide with each other for structural reasons.

However, this technique has a disadvantage in that the detection driving frequency cannot be changed freely due to a limitation of the display driving frequency even when the detection driving frequency is to be increased because of low detection speed and poor response to information input.

The present invention provides a contact detecting device improved in detection speed without increasing the detection driving frequency. The present invention also provides a display device provided with a contact detecting function which device has a structure allowing the detection driving frequency to be determined arbitrarily with a minimum limitation by display driving in a case of low detection speed and poor response to information input or in a converse case.

A contact detecting device according to an embodiment of the present invention includes a contact responding section and a contact driving scanning section.

The contact responding section produces an electric change in response to an object to be detected coming into contact with or proximity to a detecting surface.

The contact driving scanning section scans application of driving voltage to the contact responding section in one direction within the detecting surface, and controls output of the electric change in time series. At this time, the contact driving scanning section performs a plurality of scans of different regions of the contact responding section in parallel with each other, and outputs a plurality of electric changes in parallel with each other.

In the contact detecting device having such a constitution, the contact driving scanning section performs a plurality of scans of different regions of the contact responding section in parallel with each other, and therefore scanning driving frequency is lower than in a case of scanning the whole of the contact responding section. Alternatively, when the scanning driving frequency is the same, the speed of contact detection is high, that is, a time taken to complete one scan of the contact responding section is short.

In the present invention, preferably, the contact detecting device further includes a detecting line group arranged in a form of parallel stripes that are long in a direction of scanning of the contact responding section, and a detecting section configured to detect occurrence of the electric change from a voltage change in the detecting line group, and identify a position of the occurrence. In addition, at least one of a manner of intersecting the plurality of regions of the contact responding section by the detecting line group and a manner of driving the plurality of regions by the contact driving scanning section differs between the regions.

The detecting section identifies one of the plurality of regions with which region the object to be detected is in contact or to which region the object to be detected is in proximity on a basis of a voltage change pattern of a detecting line, the voltage change pattern occurring according to difference in at least one of the manner of the intersecting and the manner of the driving between the regions.

This preferable constitution is to overcome a difficulty in identifying a region that the object to be detected is in contact with (or in proximity to) when the plurality of scans are performed simultaneously in parallel with each other and electric changes are output from the identical detecting line group.

However, this constitution is not necessary provided that contact (or proximity) occurs at one position. Also when the detecting line group is separated completely in each region, this constitution is not necessary because the above identification is easy.

In the preferable constitution described above, at least one of the manner of intersecting the plurality of regions by the detecting line group and the manner of driving the plurality of regions by the contact driving scanning section differs between the regions. Thus, according to this difference, the voltage change pattern occurring in a detecting line when contact with (or in proximity to) the different regions is made differs. The detecting section identifies a region that an object to be detected is in contact with (or in proximity to) from the voltage change pattern, and identifies the position of the contact (or proximity).

More specifically and preferably, at least one of a phase and an amplitude of the driving voltage output by the contact driving scanning section differs between the plurality of regions, and the detecting section is connected to one end in the scanning direction of the detecting line group and identifies one of the plurality of regions with which region the object to be detected is in contact or to which region the object to be detected is in proximity on the basis of the voltage change pattern of the detecting line, the voltage change pattern occurring according to difference in the driving voltage.

Alternatively, when the detecting line group is separated completely as described above, the contact detecting device preferably includes two sets of a predetermined number of detecting lines, the detecting lines being long in the scanning direction of the contact responding section and being in a form of parallel stripes, and two detecting sections each connected to the predetermined number of detecting lines of the corresponding set at one end in the scanning direction, the two detecting sections each detecting occurrence of the electric change on a basis of a voltage change pattern occurring in the predetermined number of detecting lines of the corresponding set and identifying a position of the occurrence.

A display device according to an embodiment of the present invention includes a display section and a display driving scanning section. The display section subjects an amount of transmitted light to light modulation according to an input video signal, and outputs light after the modulation from a display surface. When a row in one direction of pixels as minimum units of the light modulation of the display section is a line, the display driving scanning section scans an operation of applying driving voltage for the light modulation to each line in another direction orthogonal to the line.

In the display device, a contact responding section configured to produce an electric change in response to an object to be detected coming into contact with or proximity to the display surface is formed within the display section. In addition, the display driving scanning section doubles as a contact driving scanning section configured to scan application of driving voltage to the contact responding section in one direction within the display surface, and control output of the electric change in time series. The contact driving scanning section performs a plurality of scans of different regions of the contact responding section in parallel with each other, and outputs a plurality of electric changes in parallel with each other.

According to the display device having the above constitution, the contact responding section is formed within the display section, and the display driving scanning section doubles as the contact driving scanning section so as to be able to perform scanning at a time of display driving and scanning at a time of contact driving in parallel with each other. Thus, a space within a display panel is used effectively, and constitutions within the panel can be shared as much as possible.

According to the present invention, the present invention can provide a contact detecting device improved in detection speed without increasing the detection driving frequency.

In addition, according to the present invention, it is possible to provide a display device provided with a contact detecting function which device has a structure allowing the detection driving frequency to be determined arbitrarily in a case of low detection speed and poor response to information input or with a minimum limitation by display driving in a converse case.

Additional features and advantages are described herein, and will be apparent from the following Detailed Description and the figures.

BRIEF DESCRIPTION OF THE FIGURES

FIGS. 2A and 2B are a similar equivalent circuit diagram and a similar schematic sectional view when a finger is in contact with or in proximity to the touch sensor section shown in FIGS. 1A and 1B;

FIGS. 3A, 3B, and 3C are diagrams showing input-output waveforms of the touch sensor sections according to the first to sixth embodiments;

FIG. 5 is a diagram showing an example of circuits of an alternating-current signal source for sensor driving and a voltage detector in display devices according to the first to sixth embodiments;

FIGS. 15A, 15B, and 15C are diagrams showing a pattern of counter electrodes according to the fifth embodiment, an equivalent circuit of a touch sensor section including the pattern, and an equation of a sensor voltage;

FIGS. 16A, 16B, and 16C are plan views of a state of selection of counter electrodes (determination of an electrode group simultaneously subjected to alternating-current driving) according to the fifth embodiment and shifting (reselection) of the counter electrodes;

FIG. 17 is a schematic sectional view of the display device according to the sixth embodiment;

FIGS. 18A and 18B are diagrams of assistance in explaining the operation of an FFS mode liquid crystal element according to the sixth embodiment; and FIGS. 19A and 19B are diagrams showing the operation in FIGS. 18A and 18B in section.

DETAILED DESCRIPTION

Embodiments of the present application will be described below in detail with reference to the drawings.

Preferred embodiments of the present invention will hereinafter be described with reference to the drawings taking a contact detecting device of a capacitance type and a liquid crystal display device having a function of such contact detection as main examples. Incidentally, the present invention is also applicable to a resistive film type and an optical type. In addition, while a liquid crystal display device is hereinafter taken as an example, the present invention is also applicable to other display devices such as an organic EL display device and the like.

The basics of capacitance type contact detection will be described as an item on which embodiments are premised with reference to FIGS. 1A to 3C.

Figure 1B:
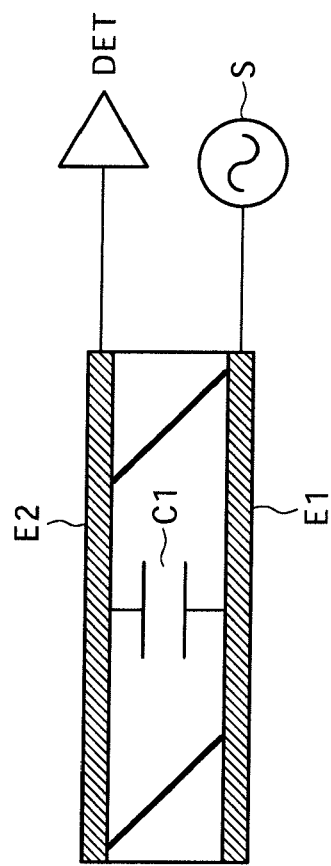
FIGS. 1A and 1B are an equivalent circuit diagram and a schematic sectional view of assistance in explaining the operation of a touch sensor section according to a first to a sixth embodiment.
Figure 1A:
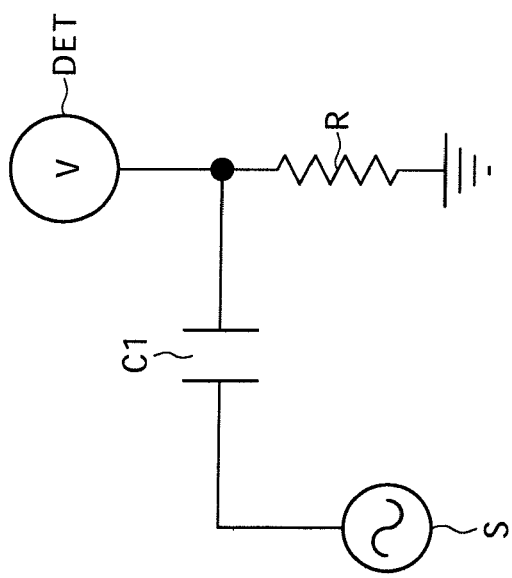

FIG. 1A and FIG. 2A are equivalent circuit diagrams of a touch sensor section. FIG. 1B and FIG. 2B are diagrams of structure (schematic sectional view) of the touch sensor section. FIGS. 1A and 1B represent a case where a finger as an objected to be detected is not in proximity to a sensor. FIGS. 2A and 2B represent a case where the finger is in proximity to or in contact with the sensor.

The illustrated touch sensor section is a capacitance type touch sensor, and is composed of a capacitive element, as shown in FIG. 1B and FIG. 2B. Specifically, the capacitive element (capacitance) C1 is formed of a dielectric D and a pair of electrodes arranged so as to be opposed to each other with the dielectric D interposed between the electrodes, that is, a driving electrode E1 and a detecting electrode E2.

As shown in FIG. 1A and FIG. 2A, the driving electrode E1 of the capacitive element C1 is connected to a driving signal source S that generates an AC pulse signal Sg. The detecting electrode E2 of the capacitive element C1 is connected to a voltage detector DET. At this time, the detecting electrode E2 is grounded via a resistance R, whereby a DC level is electrically fixed.

The AC pulse signal Sg of a predetermined frequency, for example a few [kHz] to a few ten [kHz] is applied from the driving signal source S to the driving electrode E1. The waveform of the AC pulse signal Sg is illustrated in FIG. 3B.

In response to the application of the AC pulse signal Sg, a signal (detection signal Vdet) of an output waveform shown in FIG. 3A appears in the detecting electrode E2.

Incidentally, as will be described later in detail, in an embodiment of a liquid crystal display device having the function of a contact detecting device within a liquid crystal display panel, the driving electrode E1 corresponds to a counter electrode for liquid crystal driving (electrode that is opposed to pixel electrodes and which is common to a plurality of pixels). In this case, for liquid crystal driving, the counter electrode is subjected to alternating-current driving referred to as so-called Vcom inversion driving. Thus, in embodiments of the present invention, a common driving signal Vcom for the Vcom inversion driving is used also as the AC pulse signal Sg for driving the driving electrode E1 for the touch sensor.

In a state shown in FIGS. 1A and 1B in which a finger is not in contact, the driving electrode E1 of the capacitive element C1 is driven by alternating current, and an alternating-current detection signal Vdet appears in the detecting electrode E2 with the charging and discharging of the driving electrode E1. The detection signal at this time will hereinafter be written as an "initial detection signal Vdet0." The detecting electrode E2 side is DC-grounded, but is not grounded in terms of high frequency. Therefore, there is no discharge path of alternating current, and the pulse peak value of the initial detection signal Vdet0 is relatively high. However, when a time passes after the rising of the AC pulse signal Sg, the pulse peak value of the initial detection signal Vdet0 gradually decreases due to a loss. FIG. 3C shows a waveform in an enlarged state together with a scale. The pulse peak value of the initial detection signal Vdet0 decreases by about 0.5 [V] from an initial value of 2.8 [V] with the passage of a short time due to a high-frequency loss.

When the finger comes into contact with the detecting electrode E2 or approaches the detecting electrode E2 to a close range so as to affect the detecting electrode E2 from the initial state, as shown in FIG. 2A, a circuit state changes to a state equivalent to that of a capacitive element C2 being connected to the detecting electrode E2. This is because a human body is equivalent to a capacitance having one side grounded in terms of high frequency.

In this contact state, a discharge path of an alternating-current signal via the capacitive elements C1 and C2 is formed. Thus, with the charging and discharging of the capacitive elements C1 and C2, alternating currents I1 and I2 flow through the capacitive elements C1 and C2, respectively. Therefore the initial detection signal Vdet0 is voltage-divided into a value determined by a ratio between the capacitive elements C1 and C2 or the like, and the pulse peak value decreases.

A detection signal Vdet1 shown in FIG. 3A and FIG. 3C appears in the detecting electrode E2 when the finger comes into contact. FIG. 3C shows that an amount of decrease of the detection signal is about 0.5 [V] to 0.8 [V].

The voltage detector DET shown in FIGS. 1A and 1B and FIGS. 2A and 2B detects the contact of the finger by detecting the decrease in detection signal using a threshold value Vth, for example.

First Embodiment

In the present embodiment, description will be made of an embodiment of a contact detecting device according to the present invention by taking a capacitance type touch panel externally attachable to a display panel as an example.

Figure 4A:
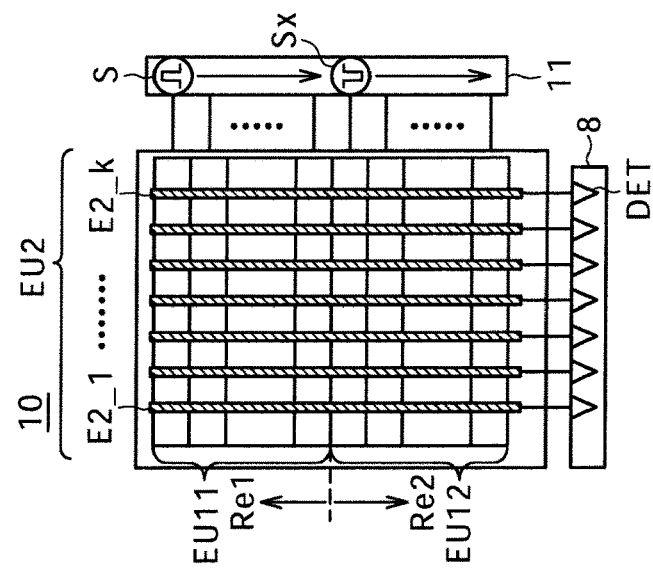
FIGS. 4A, 4B, 4C, and 4D are plan views and a schematic sectional view specialized for an arrangement of electrodes for touch detection of a display device according to the first embodiment and circuits for driving the electrodes and for detection.
Figure 4B:
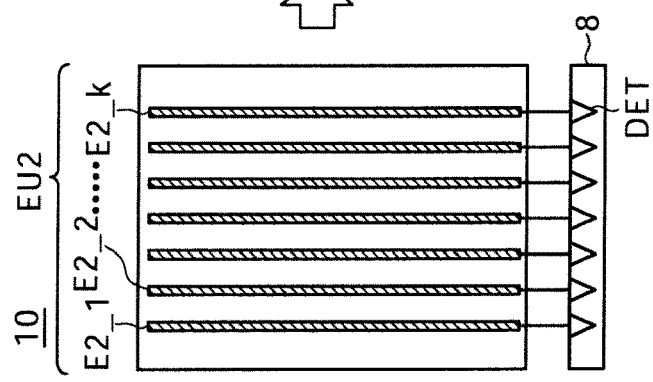
Figure 4C:
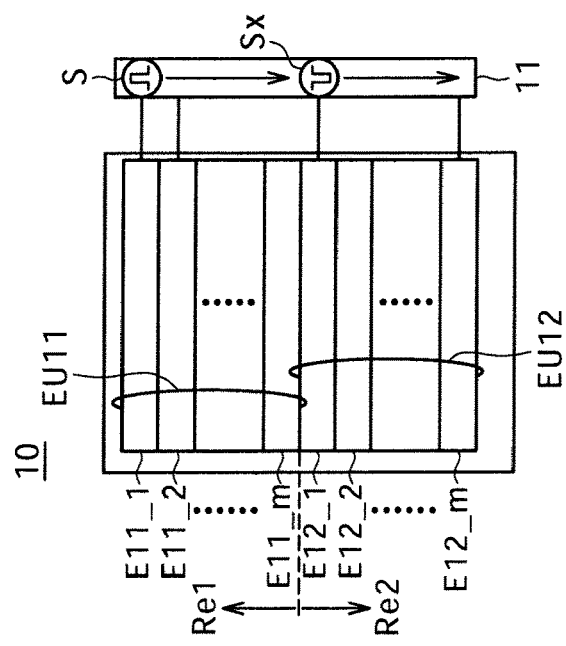
Figure 4D:
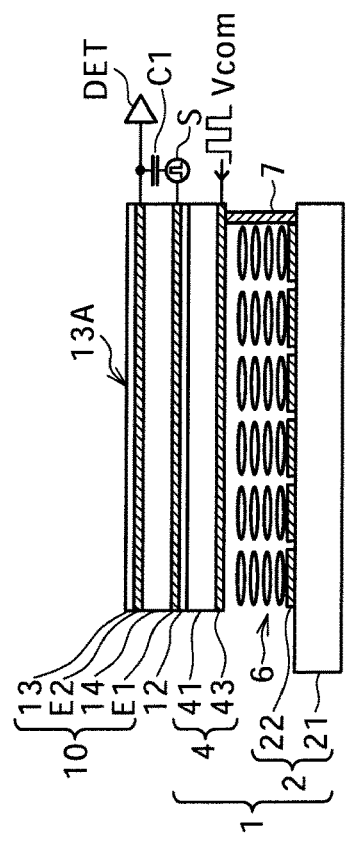

FIGS. 4A to 4C are plan views specialized for an arrangement of electrodes of the contact detecting device according to the present embodiment and circuits for driving the electrodes and for detection. FIG. 4D schematically shows a sectional structure when the contact detecting device according to the present embodiment is externally attached to the display surface side of a liquid crystal display device. FIG. 4D shows a section of six pixels in a row direction (pixel display line direction), for example.

In FIG. 4D, for easy viewing of the sectional structure, counter electrodes, pixel electrodes, and detecting electrodes are hatched, whereas hatching of other parts (substrates, insulating films, functional films and the like) is omitted. The omission of the hatching is similarly made in other subsequent diagrams of sectional structure.

Incidentally, details of the liquid crystal display device shown in FIG. 4D will be described later in another embodiment. Thus, while references used in the description are added in FIG. 4D, detailed description of the liquid crystal display device itself will be omitted in the present embodiment.

The liquid crystal display device shown in FIG. 4D includes a substrate supplied mainly with signals for driving pixels (which substrate will hereinafter be referred to as a driving substrate 2), a counter substrate 4 disposed so as to be opposed to the driving substrate 2, and a liquid crystal layer 6 disposed between the driving substrate 2 and the counter substrate 4.

The contact detecting device according to the present embodiment (which device will hereinafter be referred to as a touch panel 10) is laminated onto the counter substrate 4 via an adhesive layer 12.

The touch panel 10 includes a driving electrode E1 on the side of the liquid crystal display device and a detecting electrode E2 overlapping the driving electrode E1 with a dielectric layer 14 interposed between the driving electrode E1 and the detecting electrode E2. A protective layer 13 is formed on the detecting electrode E2.

A "detecting surface 13A" refers to an outermost surface of the protective layer 13.

In a state in which the touch panel 10 is laminated on the liquid crystal display device 1 as shown in FIG. 4D, display light is emitted to a user side through the touch panel 10, and therefore the detecting surface 13A is a display surface.

A "contact responding section" refers to a part where when a user performs an operation of bringing an object to be detected such as a finger, a pen or the like into contact with or into proximity to the detecting surface 13A, an electric change occurs in response to the operation. Thus, as is clear from correspondence with FIGS. 1A to 3C, a constitution for effecting a potential change in response to the contact or the proximity as described above, that is, a part including at least the driving electrode E1, the detecting electrode E2, and the dielectric layer 14 between the driving electrode E1 and the detecting electrode E2 in the present example corresponds to an embodiment of the "contact responding section."

As shown in FIGS. 4A to 4C, the driving electrode E1 and the detecting electrode E2 are divided in directions orthogonal to each other.

When the detecting surface 13A is viewed from the user side, the "contact responding section" is divided into a plurality of regions, for example a first region Re1 and a second region Re2, as shown in FIG. 4A. A predetermined number m of driving electrodes E1 are arranged in each of the first region Re1 and the second region Re2. In FIG. 4A, the driving electrodes E1 of the first region Re1 are indicated by references "E11_1 to E11.sub.--m," and the driving electrodes E1 of the second region Re2 are indicated by references "E12_1 to E12.sub.--m."

The driving electrodes E11_1 to E11.sub.--m or E12_1 to E12.sub.--m have a stripe shape of a relatively large width, and are arranged in parallel with each other.

The driving electrodes E11_1 to E11.sub.--m form a first set EU11 of driving electrodes. The driving electrodes E12_1 to E12.sub.--m form a second set EU12 of driving electrodes.

On the other hand, the detecting electrode E2 is formed of a predetermined number k of conductive layers in a parallel stripe arrangement that is long in a direction orthogonal to the driving electrode E1. Each of the detecting electrodes in the shape of parallel stripes will hereinafter be referred to as a "detecting line." In FIGS. 4B and 4C, the detecting lines are indicated by references "E2_1 to E2.sub.--k."

The k detecting lines E2_1 to E2.sub.--k form one set EU2 of detecting lines. One set of detecting lines is arranged in the present embodiment. Thus, in the present embodiment, the set of detecting lines (predetermined number k of detecting lines) intersects each of the first region Re1 and the second region Re2 in a same manner. More specifically, a mode of overlap between the driving electrodes and the detecting lines is the same in the first region Re1 and the second region Re2.

A detecting circuit 8 as a "detecting section" is connected to one end of the k detecting lines E2_1 to E2.sub.--k arranged as described above. The detecting circuit 8 has the voltage detector DET shown in FIGS. 1A and 1B and FIGS. 2A and 2B as a basic detection unit. A detection signal Vdet (see FIGS. 3A to 3C) is input from each of the k detecting lines E2_1 to E2.sub.--k to a corresponding voltage detector DET in the detecting circuit 8.

A contact driving scanning section 11 is connected to the driving electrodes E11_1 to E12.sub.--m.

A significant feature of the present invention is that the contact driving scanning section 11 scans a driving voltage in the first region Re1 and the second region Re2 separately and in parallel. By performing this parallel scanning, the contact driving scanning section 11 outputs an electric change occurring in the "contact responding section" in response to contact or proximity of an object to be detected, that is, a potential change in a detecting line in this case in parallel.

FIG. 5 is a diagram showing an example of configuration of the detecting circuit 8 performing a touch detecting operation together with an electrode pattern indicating the position of a detection object.

In FIG. 5, the driving electrode E11_1 indicated by hatching is selected by being connected to a driving signal source S, and other nonselected driving electrodes E11_2 to E11_5 are retained at a GND potential. A state in which a driving electrode is selected is referred to also as an on state, and a state in which a driving electrode is not selected is referred to also as an off state.

FIG. 5 shows a circuit diagram of the voltage detector DET and the driving signal source S connected to a detecting line E2.sub.--i (i=1 to k) intersecting the group of these driving electrodes. Capacitive elements C1_1 to C1_5 are formed in respective parts of intersection of the detecting line E2.sub.--i and respective counter electrodes. Incidentally, in the present embodiment, the first set EU11 of m driving electrodes and the second set EU12 of m driving electrodes are actually driven in parallel as described above.

The driving signal source S illustrated in FIG. 5 has a controlling section 91, two switches SW(+) and SW(−), a latch circuit 92, a buffer circuit (waveform shaping section) 93, and an output switch SW.

The controlling section 91 is a circuit that controls the two switches SW(+) and SW(−) for switching a positive voltage V(+) and a negative voltage V(−) and the output switch SW. The controlling section 91 can be replaced by an external CPU or the like without being provided within the driving signal source S.

The switch SW(+) is connected between the positive voltage V(+) and an input of the latch circuit 92. The switch SW(−) is connected between the negative voltage V(−) and an input of the latch circuit 92. The output of the latch circuit 92 is connected to the on-side node of the output switch SW via the buffer circuit 93. The buffer circuit 93 subjects the positive voltage V(+) and the negative voltage V(−) to potential compensation with an input potential, and then outputs the positive voltage V(+) and the negative voltage V(−).

The output switch SW is controlled by the controlling section 91 to determine whether to turn the corresponding driving signal source S on (a selected state or an active state) or to set the corresponding driving signal source S in an inactive state by GND connection. Because of synchronization with the control of other driving signal sources S, this function of the controlling section 91 is generally performed by for example a constitution in which a signal for shifting and selecting a group of driving signal sources S to be activated is passed on by a shift register or the like.

The detecting line E2 to which the capacitive elements C1_1 to C1_5 are connected is connected with a voltage detector DET.

The voltage detector DET illustrated in FIG. 5 includes an OP amplifier circuit 81, a rectifying circuit 82, and an output circuit 83.

The OP amplifier circuit 81 is formed by an OP amplifier 84, resistances R1 and R2, and a capacitance C3 as shown in FIG. 5. The OP amplifier circuit 81 forms a filter circuit for removing noise. This filter circuit has an amplification factor determined by a ratio between the resistances or the like, and functions also as a signal amplifying circuit.

The detecting line E2 is connected to the non-inverting input "+" of the OP amplifier 84. A detection signal Vdet is input from the detecting line E2. The detecting line E2 is connected to a ground potential via a resistance R so that the DC level of the potential of the detecting line E2 is electrically fixed. The resistance R2 and the capacitance C3 are connected in parallel with each other between the output and the inverting input "−" of the OP amplifier 84. The resistance R1 is connected between the inverting input "−" of the OP amplifier 84 and the ground potential.

The rectifying circuit 82 has a diode D1 for performing half-wave rectification, a charging capacitor C4, and a discharging resistance R0. The anode of the diode D1 is connected to the output of the OP amplifier circuit 81. The charging capacitor C4 and the discharging resistance R0 are each connected between the cathode of the diode D1 and the ground potential. The charging capacitor C4 and the discharging resistance R0 form a smoothing circuit.

The potential of the cathode of the diode D1 (output of the rectifying circuit 82) is read as a digital value via the output circuit 83. Only a comparator 85 for performing voltage comparison with a threshold value is shown in the output circuit 83 shown in FIG. 5. The output circuit 83 also has a function of an AD converter. The AD converter may be of an arbitrary converter type such as a resistance ladder type, a capacitance division type or the like. The output circuit 83 compares an input analog signal with a threshold value Vth (see FIG. 3A) by the comparator 85. The comparator 85 may be realized as a function of a control circuit (not shown) such as a CPU or the like. A result of the comparison is used by various applications as a signal indicating whether the touch panel is touched, for example a signal indicating whether a button operation is performed.

The threshold value Vt as a reference voltage for the comparator 85 can be changed by a control section such as a CPU or the like, and thereby the potential of the detection signal Vdet can be determined.

Description will be returned to FIGS. 4A to 4D.

The contact driving scanning section 11 shown in FIGS. 4A to 4D has a driving signal source S and an inverted driving signal source Sx that outputs a driving voltage inverted in phase with respect to that of the driving signal source S.

The contact driving scanning section 11 performs alternating-current driving of the first set EU11 of driving electrodes in the first region Re1 by the driving signal source S, and performs alternating-current driving of the second set EU12 of driving electrodes by the inverted driving signal source Sx. The objects of the alternating-current driving are sequentially shifted in one direction in driving electrode units, whereby scanning is performed. While the scanning is performed in the same direction in FIGS. 4A to 4D, the scanning may be performed in opposite directions. In addition, back-and-forth scanning of both the first set EU11 and the second set EU12 may be repeated. Alternatively, a blanking period may be provided, and scanning of both the first set EU11 and the second set EU12 may be repeated with one same end as a starting point.

Figure 6:
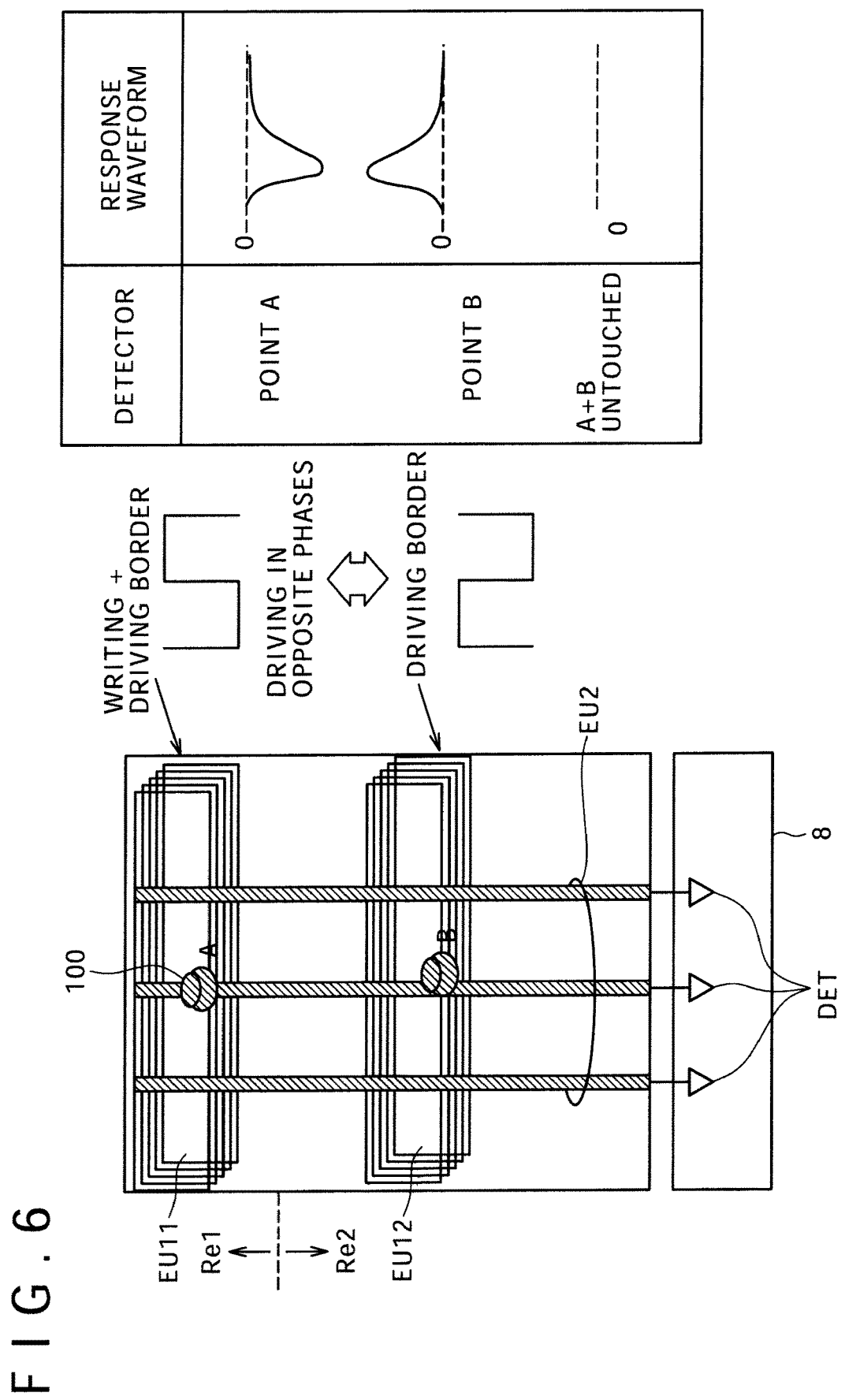
FIG. 6 is a diagram showing opposite-phase driving and response waveforms of a detecting line in the first embodiment.

FIG. 6 shows opposite-phase driving and the response waveforms of a detecting line in the present embodiment.

Incidentally, the "response waveforms" in FIG. 6 schematically represent a change component of a detection signal Vdet at a time of so-called impulse response in which a finger 100 is brought into contact with the detecting surface 13A (see FIG. 4D) only for a very short time and is taken off immediately.

A driving voltage in scanning the first set EU11 of driving electrodes (operation of shifting the application of the driving voltage) in the first region Re1 shown in FIG. 6 is opposite in phase from a driving voltage in scanning the second set EU12 of driving electrodes in the second region Re2. When contact is made simultaneously at a position (point A) in the first region Re1 and a position (point B) in the second region Re2 which positions correspond to the same detecting line (written as "A+B"), no response waveform occurs, or even if a response waveform occurs, the response waveform is so small as to be negligible. The same is true for a case where no contact is made at either point (written as "untouched").

On the other hand, when potential is lowered as shown in FIG. 6 due to contact at point A, a potential change in which the potential rises occurs at point B. Conversely, when the potential rises due to contact at point A, the potential decreases at point B. On the other hand, in the case of simultaneous contact at points A and B, the positive potential and the negative potential cancel each other out, so that apparently no potential change occurs in the detecting line.

The "detecting section" including the detecting circuit 8 and a CPU or the like not shown in the figure first determines the x-direction address of a contact position by determining in which of the k detecting lines a potential change has occurred. In addition, the detecting section determines the y-direction address of the contact position from the timing of scanning and the timing of a change in output. At this time, whether contact has been made in the first region Re1 or whether contact has been made in the second region Re2 can be determined on the basis of a degree of occurrence of the potential change, that is, positive polarity or negative polarity. Incidentally, because it is very rare that timings and contact times of contact with two points are exactly the same, some response waveform occurs even in the case of simultaneous contact, and it can also be determined that the simultaneous contact with the two points has occurred in the case of a pattern of occurrence of the response waveform, for example a case where a positive potential change and a negative potential change occur consecutively.

In FIG. 6, "WRITING+DRIVING BORDER" is displayed in the first region Re1, and "DRIVING BORDER" is displayed in the second region Re2. This display means that the writing of a video signal for display on the liquid crystal display device 1 is started in the first region Re1, and that contact driving scanning is started in parallel in the first region Re1 and the second region Re2. While thus synchronizing contact driving with display driving is optional, synchronizing contact driving and display driving with each other is desirable because of an advantage of sharing a scanning driving section.

Advantages of the present embodiment will next be described.

The present embodiment can greatly reduce the time of one scan by performing driving scanning for contact detection twice or more in parallel within a same time.

On the other hand, when the present invention is not applied, that is, when one scan is performed using all of one frame (F) of the touch panel 10, the frequency of the scan is 60 Hz (the time of one scan for 1 F is 16.7 [msec]).

However, in such a case, when a screen is touched immediately after a scan is passed, the touch is detected 33.4 (=16.7.times.2) [msec] after the touch, and the touching of the screen is recognized only after subsequent processing in the CPU or the like. On the basis of the recognition, an image is changed according to an application, and in a case of an operating switch, the switch is turned on or off.

For example, application software processing after a touch is said to take about 50 to 100 [msec], and a response transmitted to a user takes as long as about 100 [msec]. The user feels that this response is very slow, and feels stress.

When display is synchronized with the detection of the touch panel, a method of increasing the frequency of frames to be written is considered in order to alleviate a delay from the touch to the appearance of response.

However, when the writing frequency is increased, a writing defect occurs, and image processing with a heavy processing load or the like is necessary. Because an image needs to be created from a signal of 60 [Hz], for example, disadvantages such as large-scale image processing, a substantial increase in power consumption, and the like are incurred.

In the present embodiment, two or more driving lines of the touch panel are scanned simultaneously, writing for display is performed by only one of the driving lines, and the other performs alternating-current driving of only driving electrodes for contact detection without the writing being involved.

Therefore the scan frequency of the touch panel can be doubled when two detection driving scans are performed simultaneously, and tripled when three detection driving scans are performed simultaneously. Incidentally, two regions for inversion driving are provided in the above example. In general, however, when N regions are provided, the phase of the driving voltages is preferably shifted by each of N equal parts of one cycle. In this case, determination may be difficult with only the positive polarity and the negative polarity of changes in potential of the detecting line. In this case, a region in which contact has occurred can be identified by determining the level of the potential changes in addition to polarity while changing the reference potential of the comparator shown in FIG. 5.

Incidentally, synchronization with the writing of the display device does not necessarily need to be achieved. Even in that case, because the driving frequency of contact detection is decreased, power consumption is correspondingly reduced, or the response of the touch panel can be enhanced.

Second Embodiment

In the present embodiment, in a case of a plurality of regions, for example a case where the number of regions is two, contact driving voltages having different amplitude levels are supplied to a first region Re1 and a second region Re2.

Figure 7:
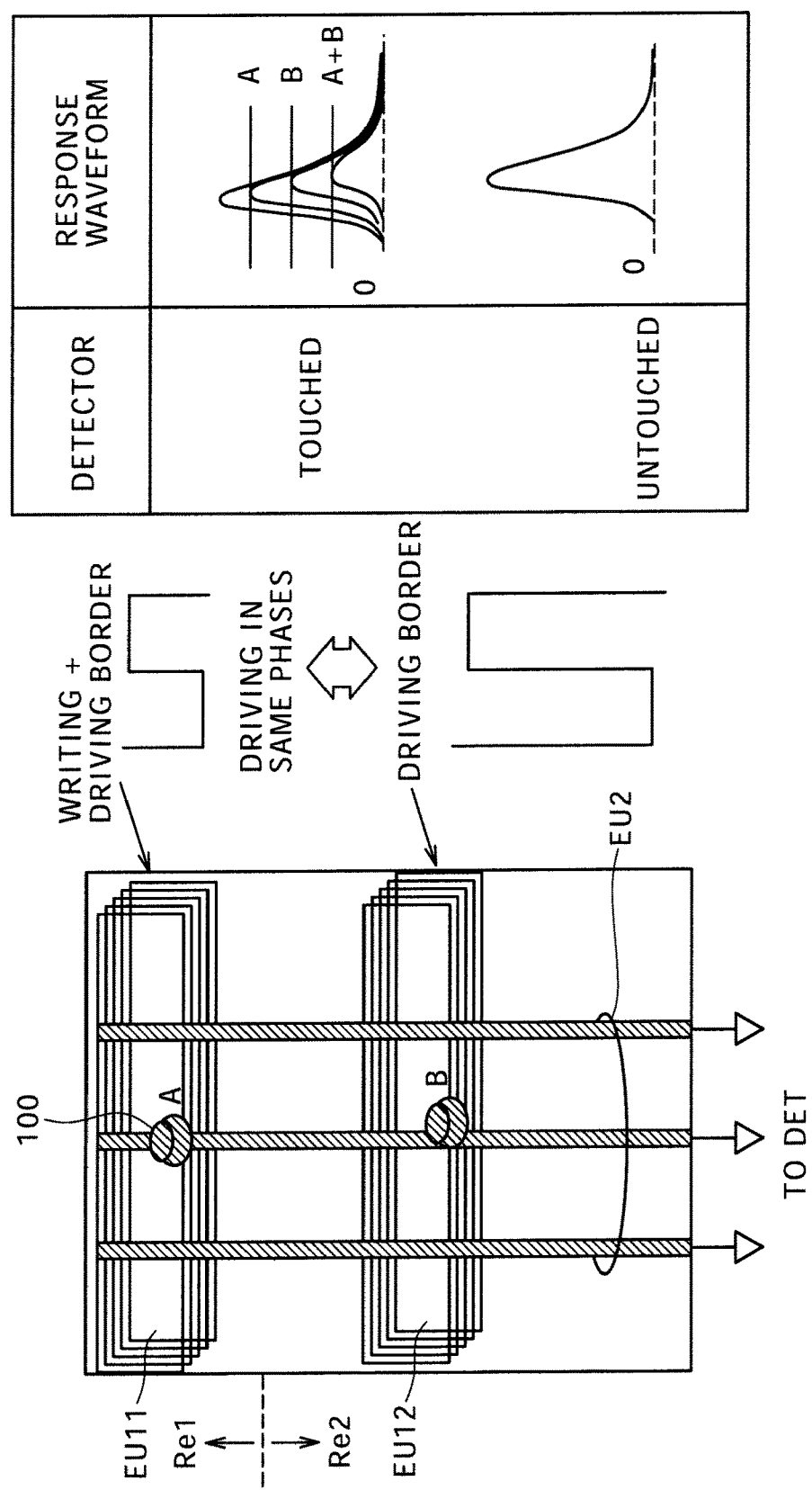
FIG. 7 is a diagram showing driving with different amplitudes and response waveforms of a detecting line in the second embodiment.
Figure 8:
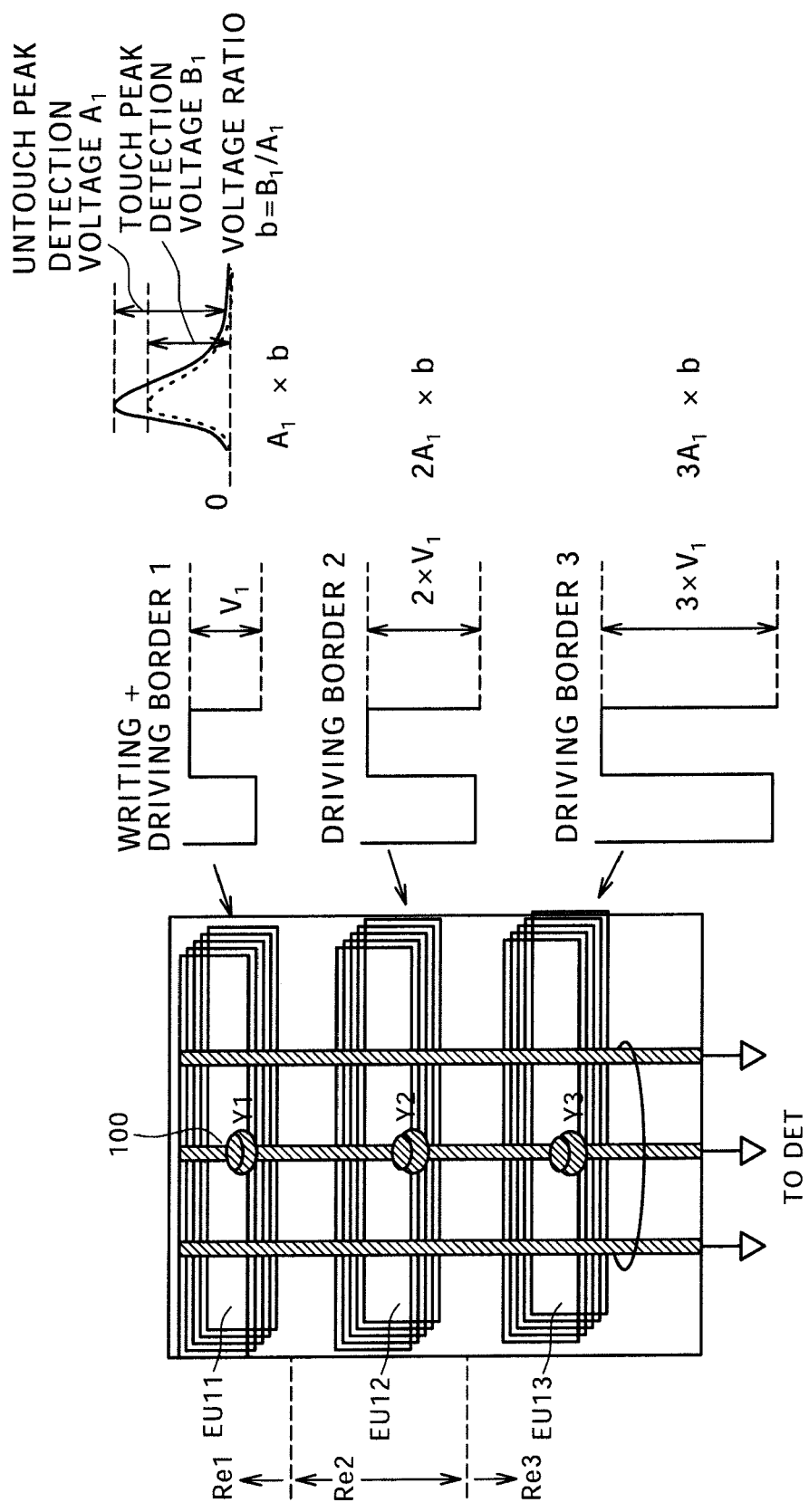
FIG. 8 is a diagram in a case where kinds of amplitude of driving voltage are further increased in the second embodiment.
Figure 9:
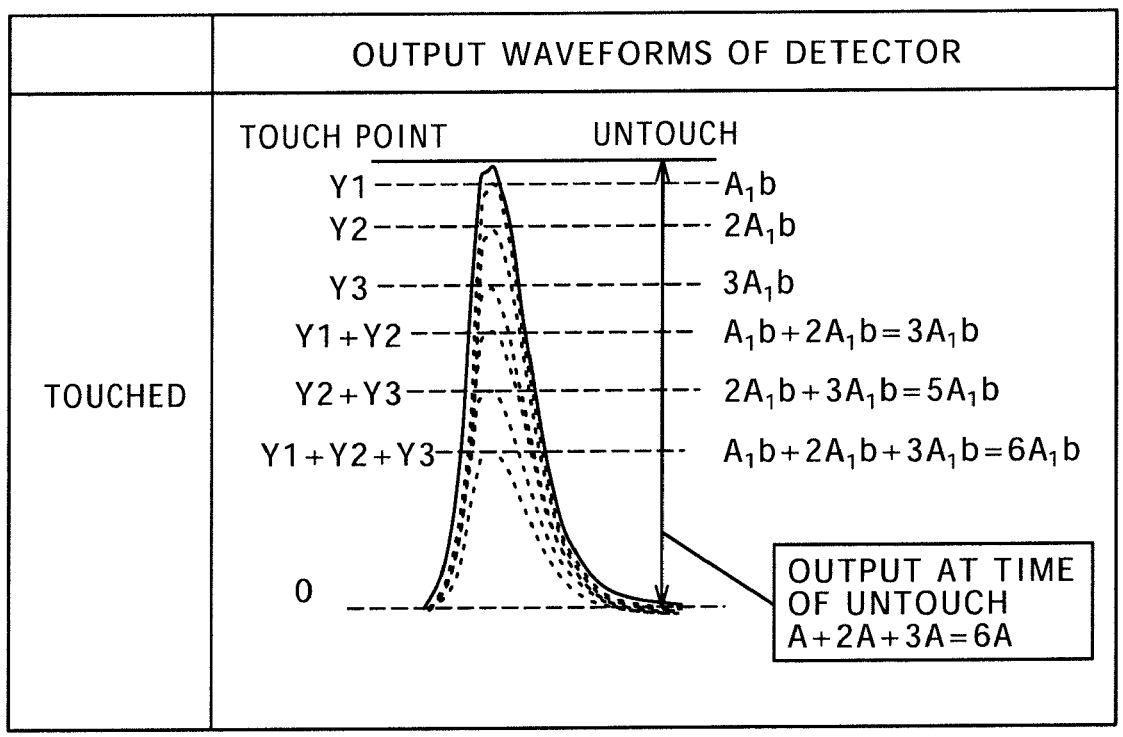
FIG. 9 is a diagram showing in detail the potential levels of the response waveforms in FIG. 8.

FIG. 7 shows response waveforms when the number of regions and the number of amplitude levels are two. FIG. 8 and FIG. 9 show response waveforms when the number of regions and the number of amplitude levels are three.

In the embodiment shown in FIG. 7, a driving voltage supplied to a first set EU11 of driving electrodes in the first region Re1 is different in amplitude from a driving voltage supplied to a second set EU12 of driving electrodes in the second region Re2. FIG. 7 illustrates a case where the amplitude of the latter driving voltage is substantially twice the amplitude of the former driving voltage. The two driving voltages are in phase with each other.

The second embodiment is the same as the first embodiment except that the driving voltages are in phase with each other and have the amplitude difference. Therefore, FIGS. 4A to 4D are applied also to the second embodiment except that the contact driving scanning section 11 in FIGS. 4A to 4D has an in-phase alternating-current signal source for double the amplitude in place of the inverted driving signal source Sx. In addition, FIG. 5 is similarly applied.

As shown in FIG. 7, the peak value of a response waveform in the case of non-contact (untouched) is highest. A response waveform in a case where point A on the side of a small driving amplitude (first region Re1) is touched has a next highest peak value. A response waveform in a case where point B on the side of a large driving amplitude (second region Re2) is touched has a next highest peak value. The peak value of a response waveform in a case where both points are touched simultaneously is decreased most and is a minimum. The detecting circuit 8 can identify a region that has been touched by detecting the level differences while changing the reference voltage (threshold value Vt) of the comparator 85 in FIG. 5.

In an example shown in FIG. 8, one more region, that is, a third region Re3 is added.

A third set EU13 of driving electrodes is provided in the third region Re3. The contact driving scanning section 11 (see FIGS. 4A to 4D) applies a driving voltage of largest amplitude to the driving electrodes of the third set EU13.

In FIG. 8, a point of contact of a finger 100 with a same detecting line in the first region Re1 is indicated as point Y1, a point of contact of the finger 100 with the same detecting line within the second region Re2 is indicated as point Y2, and a point of contact of the finger 100 with the same detecting line within the third region Re3 is indicated as point Y3. Supposing that a driving voltage at point Y1 is "$V_1$," an alternating-current pulse of an amplitude "$2 \times V_1$" is applied at point Y2, and an alternating-current pulse of an amplitude "$3 \times V_1$" is applied at point Y3.

When the detection voltage of the detecting line in the voltage detector DET is decreased from $A_1$ to $B_1$ ($<A_1$) at a time of contact with only point Y1, the ratio of the changing voltage (hereinafter referred to as a rate of change) is set as "b ($=B_1/A_1$)." In this case, the potential of the detecting line changes at the same rate of change b at a time of contact with only point Y2 and at a time of contact with only point Y3.

On the other hand, the peak value of a response waveform in a case where no contact is made with any point (untouched) is $6A_1$ ($=A_1+2A_1+3A_1$) as a total of the peak values of the three kinds of driving voltages. When contact is made simultaneously at a plurality of points, a different potential change occurs according to a combination of the points.

FIG. 9 shows potential changes (potential decreases) in all combinations in an overlapped state.

From FIG. 9, a combination in which contact has occurred can be uniquely determined by the level of a potential decrease in the detecting line. This level recognition can also be performed by changing the reference voltage (threshold value Vt) of the comparator 85 in FIG. 5, for example.

Third Embodiment

Two sets EU2 of k detecting lines are provided in the present embodiment.

Figure 10:
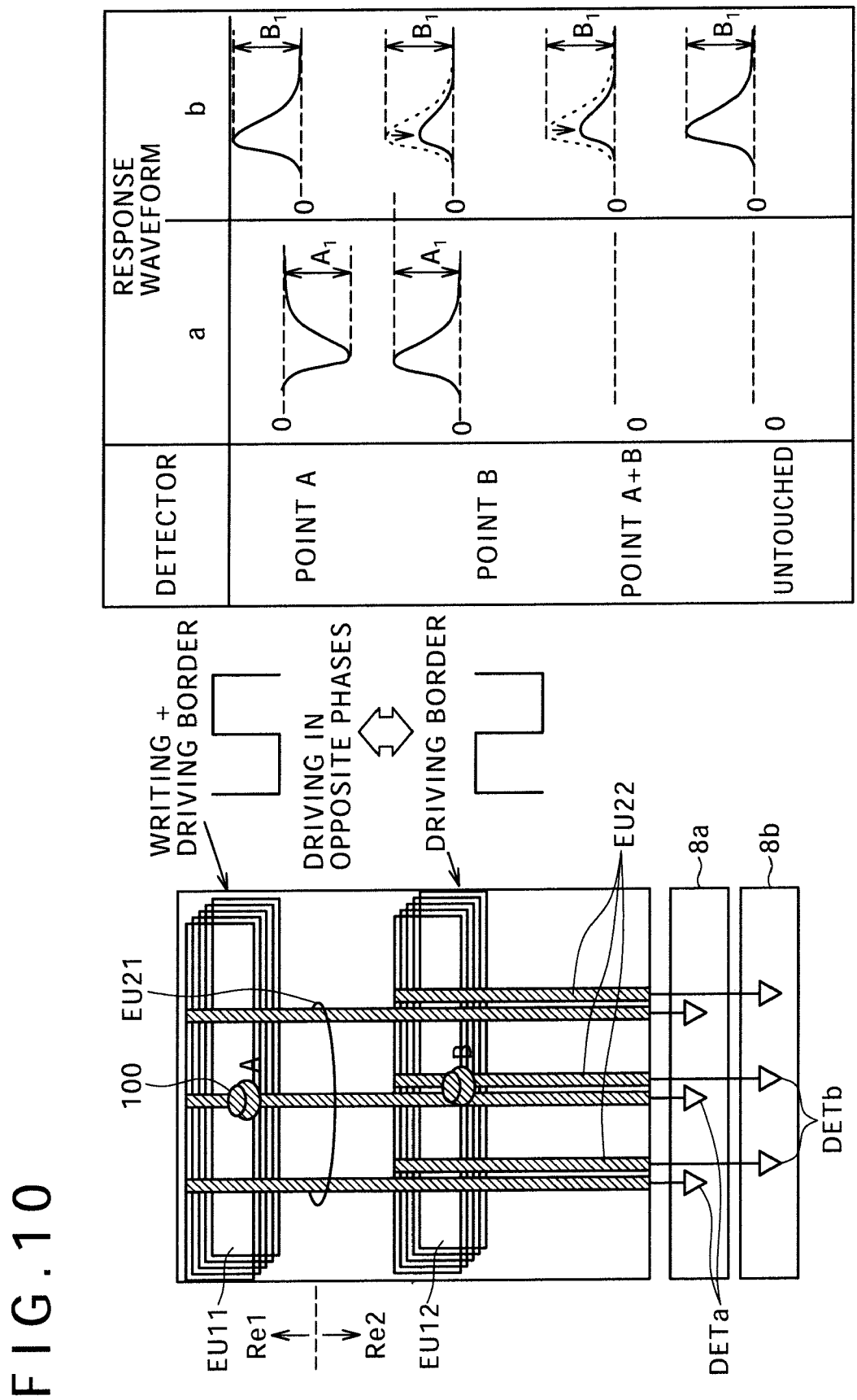
FIG. 10 is a diagram showing opposite-phase driving and response waveforms of a detecting line in the third embodiment.
Figure 11:
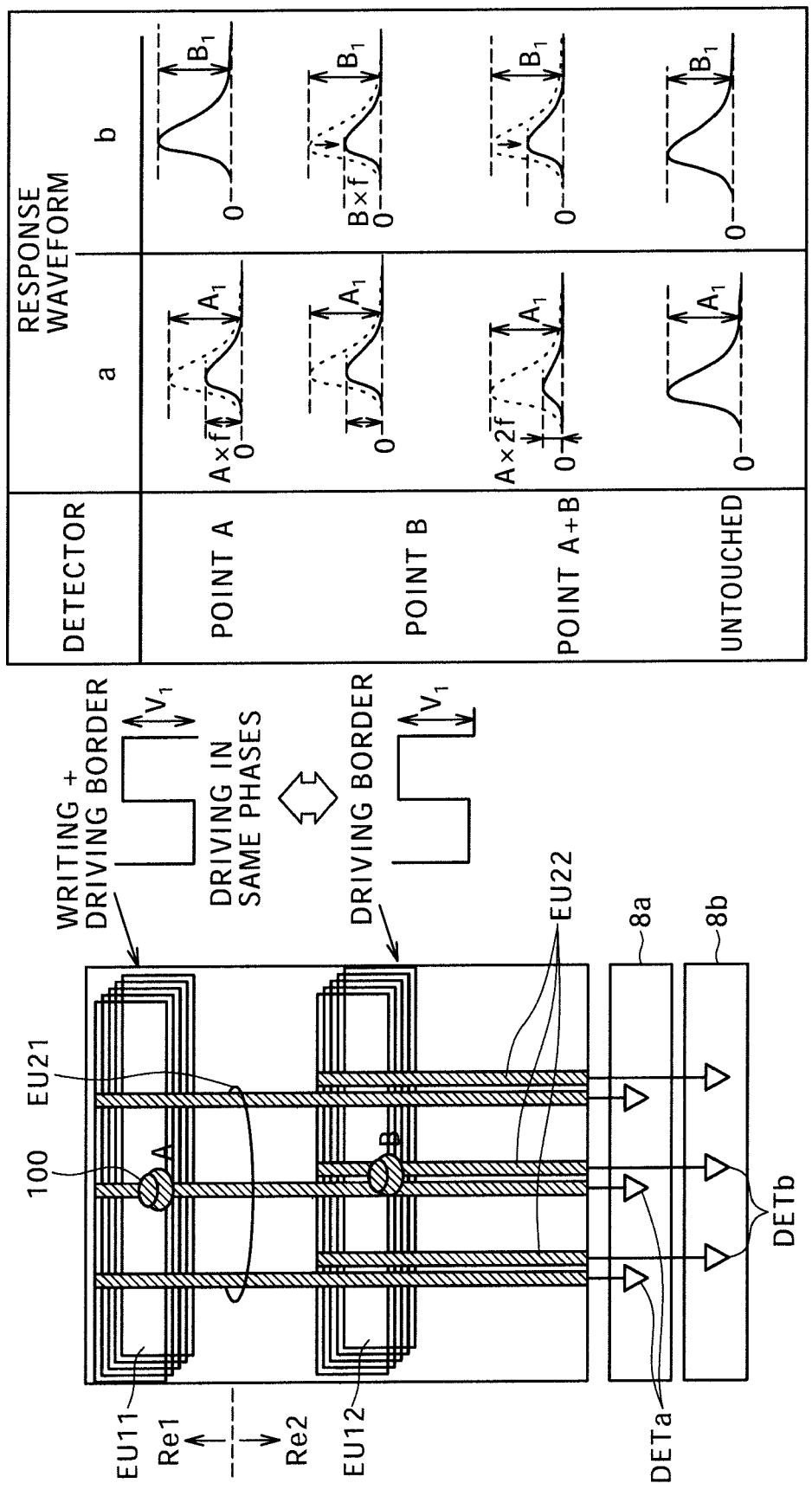
FIG. 11 is a diagram showing in-phase driving and response waveforms of a detecting line in the third embodiment.

FIG. 10 shows response waveforms in a case of opposite-phase driving. FIG. 11 shows response waveforms in a case of in-phase driving.

The third embodiment is the same as the first and second embodiments in that the third embodiment has a set of detecting lines that intersect a first region Re1 and a second region Re2 in a same manner (which set will hereinafter be referred to as a first set EU21), as shown in FIG. 10 and FIG. 11. The present embodiment is further provided with another set of k detecting lines that intersect only the second region Re2. The k additional detecting lines will hereinafter be referred to as a second set EU22 of detecting lines.

A detecting circuit 8a including k voltage detectors DETa is connected to one end of the first set EU21 of detecting lines. Similarly, a detecting circuit 8b including k voltage detectors DETb is connected to one end of the second set EU22 of detecting lines. A constitution including the detecting circuits 8a and 8b corresponds to an embodiment of "two detecting sections."

When the two sets of detecting lines intersecting the regions in different manners are thus provided, and further the detectors are provided separately for each set of detecting lines, response waveforms appearing in the inputs of the detectors as shown in FIG. 10 are obtained.

Response waveforms similar to those of FIG. 6 are obtained in the voltage detectors DETa.

On the other hand, in the voltage detectors DETb, positive response waveforms are obtained at a time of non-contact (untouched) and at a time of contact with point A, and positive response waveforms decreased in potential from the positive response waveforms obtained at a time of non-contact (untouched) and at a time of contact with point A are obtained at a time of contact with point B and at a time of contact with points A+B. In this case, the maximum peak value of detection voltage differs between point A and point B. This is because the detecting lines connected to the voltage detectors DETa and DETb, respectively, are different from each other in length, and are consequently different from each other in load capacitance. In FIG. 10, a maximum peak value at point A is denoted by a reference "$A_1$," and a maximum peak value at point B is denoted by a reference "$B_1$."

The third embodiment has an advantage of being able to distinguish especially points A+B and non-contact (untouched) from each other more reliably than the first embodiment.

FIG. 11 represents a case where the opposite-phase driving of FIG. 10 is changed to in-phase driving.

Also in this case, as in FIG. 10, the maximum peak value of detection voltage differs between the voltage detectors DETa and DETb due to difference in load capacitance which difference is caused by the lengths of the detecting lines. Also in this case, a maximum peak value at point A is denoted by a reference "$A_1$," and a maximum peak value at point B is denoted by a reference "$B_1$." A driving voltage amplitude is denoted by $V_1$.

In a case of non-contact (untouched) with both of point A and point B, the detection voltage input to a voltage detector DETa maintains the maximum peak value $A_1$, and the detection voltage input to a voltage detector DETb maintains the maximum peak value $B_1$.

In a case of contact with only point A, the detector DETb does not change a state of output of the maximum peak value $B_1$, but the detection voltage of the detector DETa decreases from the maximum peak value $A_1$ at a rate of change f ($0<f<1$).

In a case of contact with only point B, the detector DETb also decreases the detection voltage from the maximum peak value $B_1$ at the rate of change f.

In a case of simultaneous contact with point A and point B, the detection voltage of the detector DETa is further decreased from that in the case of contact with only point B at the rate of change f. The detection voltage input to the detector DETa at this time is observed to decrease from the initial maximum peak value $A_1$ at a rate of 2f.

Thus, the driving method illustrated in FIG. 11 also has an advantage of being able to distinguish the four cases as combinations of contact and non-contact reliably.

FIGS. 4A to 4D and FIG. 5 of the first embodiment are applicable also to the third embodiment except for differences in the manner of overlapping of such detecting lines and the manner of driving.

Incidentally, the third embodiment and the second embodiment can be combined with each other arbitrarily.

Thus, "the detecting section can identify a region where contact has occurred on the basis of a pattern of voltage change in a detecting line which pattern occurs according to difference in at least one of the manner of intersection of the detecting line and the manner of driving between regions."

Fourth Embodiment

Figure 12:
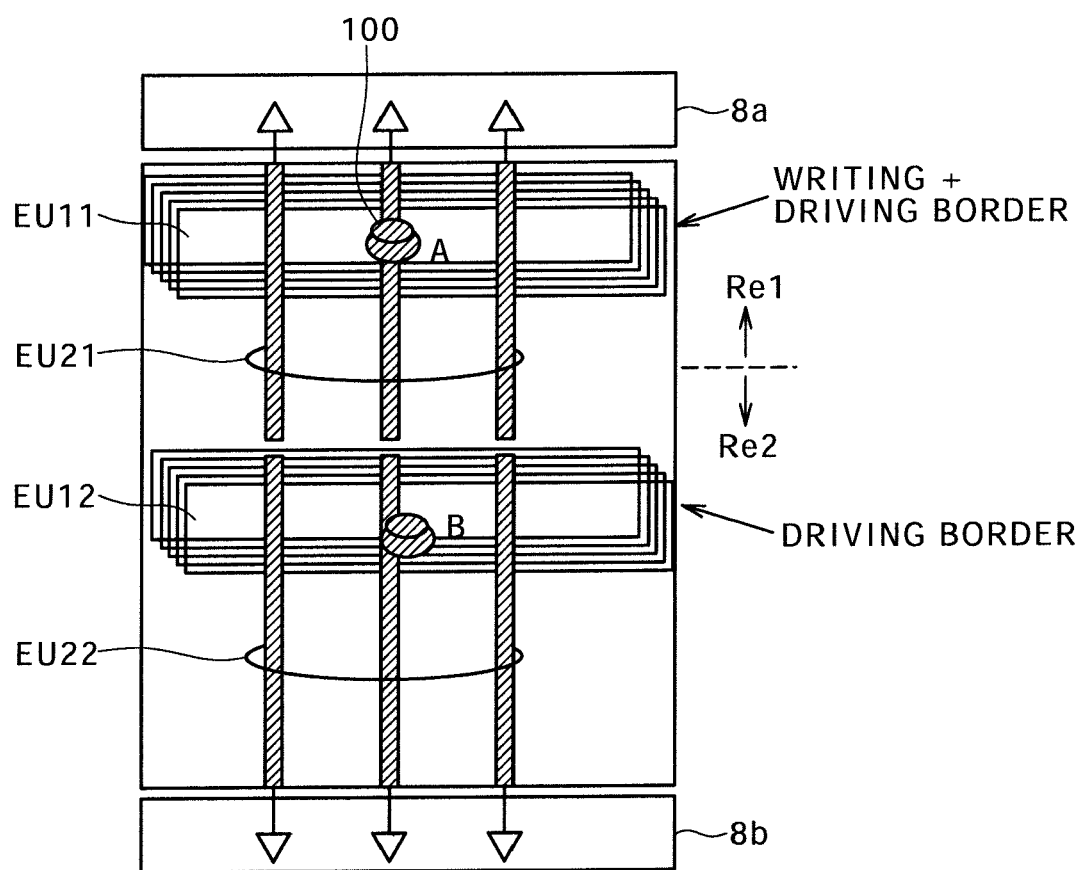
FIG. 12 is a diagram showing an arrangement of detecting lines and detecting circuits in the fourth embodiment.

FIG. 12 is a diagram of a constitution of a fourth embodiment.

In a driving method illustrated in FIG. 12, a set of k detecting lines in a first region Re1 is completely separated from a set of k detecting lines in a second region Re2. For example, a detecting circuit 8a is connected to the detecting lines on the first region Re1 side, and a detecting circuit 8b is connected to the detecting lines on the second region Re2 side. Thus, as shown in FIG. 12, the two detecting circuits 8a and 8b are desirably disposed on both sides in a scanning direction.

In the fourth embodiment, though driving voltage is the same, combinations of the detecting lines and the detecting circuits are in separate systems, so that a region in which contact has been made can be determined easily.

When applied to a display panel, however, the fourth embodiment tends to be wasteful of a space for arranging the detecting circuits. Specifically, there is a desire to maximize an effective display area of a display panel and to minimize a frame space of the display panel. This desire is strong especially for a display panel included in a small electronic device. Generally, in order to save the frame space, signals and voltages are often input and output between the display panel and the outside en bloc from one side (one edge side) of the display panel by a flexible board or the like.

The arrangement of the detecting circuits in FIG. 12 poorly matches with such an input-output form. When it is not possible to arrange the two detecting circuits on both sides as in FIG. 12, wiring to one detecting circuit needs to be routed by half an outer circumference of the display panel. However, there is a fear of a minute signal potential being affected by noise and thus an S/N ratio being lowered. Therefore, an additional circuit load such as an increase in signal amplification factor of the detecting circuits 8 or the like is imposed.

However, a method according to the present embodiment is a simplest and reliable method in regard to region determination, and is suitable when a degree of freedom of arrangement of the detecting circuits is high.

Fifth Embodiment

In a fifth embodiment, the function of a touch panel is included within a liquid crystal display panel. In this case, desirably, a part of display driving electrodes serve also as a detection driving electrode. In addition, a device that prevents detection driving from affecting display is necessary.

Incidentally, the present embodiment can be arbitrarily combined with the first to fourth embodiments described above. The operation in detection driving has already been described. Thus, the operation and the constitution of a display device will be described below in detail.

A liquid crystal display device has an electrode (counter electrode) to which a common driving signal Vcom providing a reference voltage for a signal voltage for gradation display in each pixel is applied as an electrode common to a plurality of pixels. In the present embodiment, this counter electrode is used also as an electrode for sensor driving.

Figure 13:
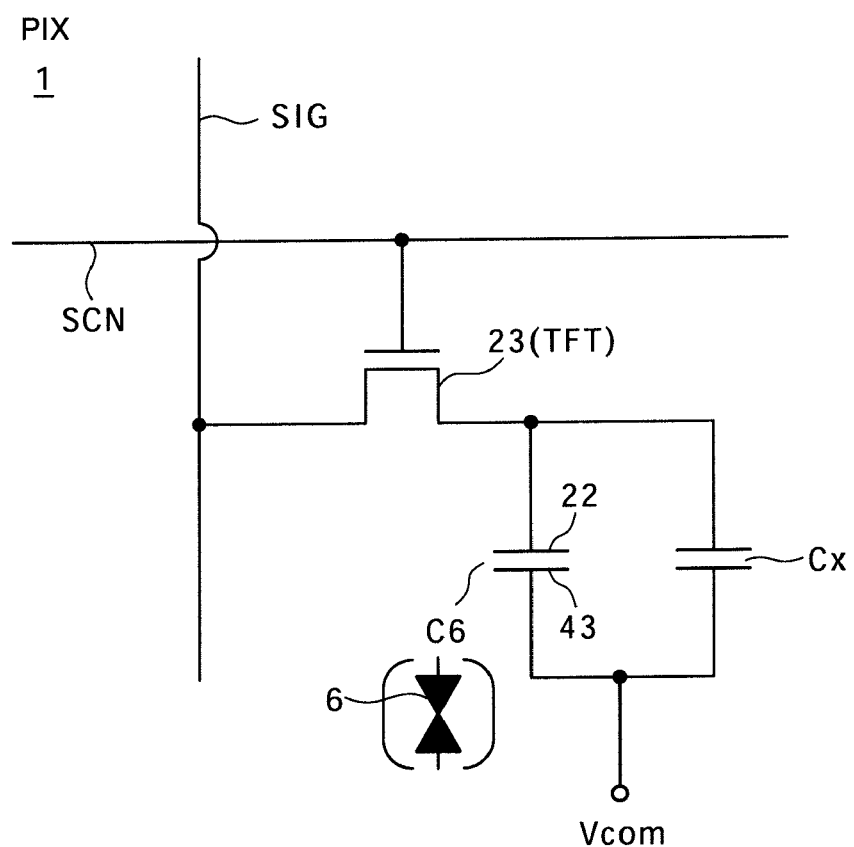
FIG. 13 is an equivalent circuit diagram of a pixel in the display devices according to the fifth and sixth embodiments.

FIG. 13 is a diagram of an equivalent circuit of a pixel. FIGS. 14A, 14B, 14C, and 14D are schematic plan views and a schematic sectional view of the display panel.

In the liquid crystal display device 1, the pixel PIX shown in FIG. 13 is arranged in the form of a matrix.

As shown in FIG. 13, each pixel PIX has a thin film transistor (TFT) (hereinafter written as a TFT 23) as a selecting element of the pixel, an equivalent capacitance C6 of a liquid crystal layer 6, and a storage capacitor (referred to also as an additional capacitance) Cx. An electrode on one side of the equivalent capacitance C6 representing the liquid crystal layer 6 is a pixel electrode 22 separated for each pixel and arranged in the form of a matrix. An electrode on the other side of the equivalent capacitance C6 is a counter electrode 43 common to a plurality of pixels.

The pixel electrode 22 is connected to one of the source and the drain of the TFT 23. A signal line SIG is connected to the other of the source and the drain of the TFT 23. The signal line SIG is connected to a horizontal driving circuit not shown in the figure. A video signal having a signal voltage is supplied from the horizontal driving circuit to the signal line SIG.

The counter electrode 43 is supplied with a common driving signal Vcom. The common driving signal Vcom is generated by inverting a positive or negative potential with a central potential as a reference in each horizontal period (1H).

The gate of the TFT 23 is electrically made common to all pixels PIX arranged in a row direction, that is, a horizontal direction of a display screen, whereby a scanning line SCN is formed. The scanning line SCN is supplied with a gate pulse for opening and closing the gate of the TFT 23, which gate pulse is output from a vertical driving circuit not shown in the figure. Therefore the scanning line SCN is referred to also as a gate line.

As shown in FIG. 13, the storage capacitor Cx is connected in parallel with the equivalent capacitance C6. The storage capacitor Cx is provided to prevent a shortage of accumulating capacitance with the equivalent capacitance C6 alone and a decrease in writing potential due to a leakage current of the TFT 23 or the like. The addition of the storage capacitor Cx also contributes to the prevention of flicker and the improvement of uniformity of screen luminance.

As viewed in a sectional structure (FIG. 14D), the liquid crystal display device 1 in which such pixels are arranged has a substrate that includes the TFT 23 shown in FIG. 13, the TFT 23 being formed in a position not appearing in the section, and which is supplied with a driving signal (signal voltage) for the pixels (which substrate will hereinafter be referred to as a driving substrate 2). The liquid crystal display device 1 also has a counter substrate 4 disposed so as to be opposed to the driving substrate 2 and a liquid crystal layer 6 disposed between the driving substrate 2 and the counter substrate 4.

The driving substrate 2 has a TFT substrate 21 (a substrate body section is formed by glass or the like) as a circuit substrate in which the TFT 23 in FIG. 13 is formed and a plurality of pixel electrodes 22 arranged in the form of a matrix on the TFT substrate 21.

A display driver (the vertical driving circuit, the horizontal driving circuit and the like) not shown in the figure for driving each pixel electrode 22 is formed in the TFT substrate 21. In addition, the TFT 23 shown in FIG. 13 as well as wiring such as the signal line SIG, the scanning line SCN and the like is formed in the TFT substrate 21. The detecting circuit 8 for performing touch detecting operation (FIG. 5) and the like may be formed in the TFT substrate 21.

The counter substrate 4 has a glass substrate 41, a color filter 42 formed on one surface of the glass substrate 41, and the counter electrode 43 formed on the color filter 42 (liquid crystal layer 6 side). The color filter 42 is formed by periodically arranging color filter layers of three colors of red (R), green (G), and blue (B), for example, with each pixel (or each pixel electrode 22) associated with one of the three colors R, G, and B. Incidentally, there are cases where a pixel associated with one color is referred to as a "sub-pixel" and a set of sub-pixels of the three colors R, G, and B is referred to as a "pixel." In this case, however, sub-pixels are also written as "pixels PIX."

The counter electrode 43 serves also as a sensor driving electrode forming a part of a touch sensor performing touch detecting operation, and corresponds to the driving electrode E1 in FIGS. 1A and 1B and FIGS. 2A and 2B.

The counter electrode 43 is connected to the TFT substrate 21 by a contact conductive column 7. The common driving signal Vcom of an alternating-current pulse waveform is applied from the TFT substrate 21 to the counter electrode 43 via the contact conductive column 7. This common driving signal Vcom corresponds to the AC pulse signal Sg supplied from the driving signal source S in FIGS. 1A and 1B and FIGS. 2A and 2B.

A detecting line 44 (44_1 to 44.sub.--k) is formed on the other surface (display surface side) of the glass substrate 41, and a protective layer 45 is formed on the detecting line 44. The detecting line 44 forms a part of the touch sensor, and corresponds to the detecting electrode E2 in FIGS. 1A and 1B and FIGS. 2A and 2B. A detecting circuit DET (FIG. 5) for performing touch detecting operation may be formed in the glass substrate 41.

The liquid crystal layer 6 modulates light passing through the liquid crystal layer 6 in a direction of thickness (direction in which the electrodes are opposed to each other) according to a state of an electric field applied to the liquid crystal layer 6 as a "display functional layer." As the liquid crystal layer 6, liquid crystal materials in various modes such as TN (Twisted Nematic), VA (Vertical Alignment), and ECB (Electrically Controlled Birefringence), for example, are used.

Incidentally, alignment films are respectively disposed between the liquid crystal layer 6 and the driving substrate 2 and between the liquid crystal layer 6 and the counter substrate 4. In addition, polarizers are respectively disposed on the non-display surface side (that is, the back side) of the driving substrate 2 and on the display surface side of the counter substrate 4. These optical functional layers are not shown in FIGS. 14A to 14D.

Figure 14A:
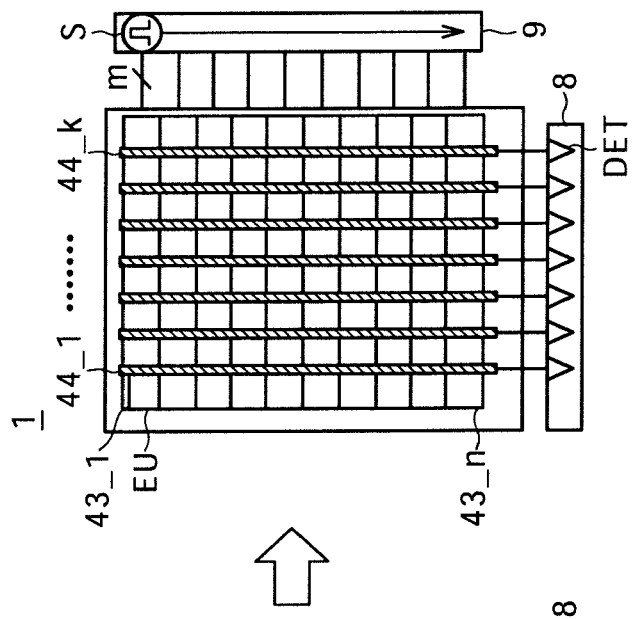
FIGS. 14A, 14B, 14C, and 14D are plan views and a schematic sectional view specialized for an arrangement of electrodes for touch detection of the display device according to the fifth embodiment and circuits for driving the electrodes and for detection.

As shown in FIG. 14A, the counter electrode 43 is divided in a direction of rows or columns of a pixel arrangement, or a column direction (vertical direction of the figure) in the present example. The direction of this division corresponds to a direction of scanning of pixel lines in display driving, that is, a direction in which a vertical driving circuit not shown in the figure sequentially activates scanning lines SCN.

The counter electrode 43 is divided into n pieces in total from a need for the counter electrode 43 to serve also as driving electrode. Thus, counter electrodes 43_1, 43_2, . . . , 43.sub.--m, . . . , 43.sub.--n are arranged in the form of a plane having a stripe-shaped pattern that is long in a row direction, and are spread all over in parallel with each other with a clearance from each other within the plane.

At least two or more counter electrodes, or m ($<$n) counter electrodes of the n divided counter electrodes 43_1 to 43.sub.--n are driven simultaneously. That is, a common driving signal Vcom is applied to m counter driving electrodes 43_1 to 43.sub.--m simultaneously, and the potential of the common driving signal Vcom repeats inversion in each horizontal period (1H). At this time, other counter electrodes do not vary in potential because the other counter electrodes are not supplied with the driving signal. In the present embodiment, a bundle of counter electrodes driven simultaneously will be written as an alternating-current driven electrode unit EU.

In the present embodiment, the number of counter electrodes in each alternating-current driven electrode unit EU is a fixed number m. In addition, the alternating-current driven electrode unit EU shifts stepwise in the column direction while changing a combination of the bundled counter electrodes. That is, the combination of counter electrodes selected as the alternating-current driven electrode unit EU changes in each shift. In two shifts, only one divided counter electrode is removed from the selection, and a divided counter electrode is newly selected instead.

Then counter driving electrodes 43_1 to 43.sub.--n are thus arranged at equal distances by the number of pixels in the column direction. When Vcom alternating-current driving is repeated, the n counter driving electrodes 43_1 to 43.sub.-n shift the combination of m ($<$n) counter electrodes selected as one alternating-current driven electrode unit EU with a pitch at which counter electrodes are arranged in the column direction as a unit. The "pitch of counter electrodes" in this case is a distance obtained by totaling the width of a counter electrode in the column direction and a clearance to another counter electrode adjacent on one side in the direction of the width. The pitch of counter electrodes in the column direction is generally equal to a pixel size in the column direction.

The Vcom driving with the alternating-current driven electrode unit EU of such counter electrodes and the shift operation are performed by a Vcom driving circuit 9 as a "display driving scanning section" provided within the vertical driving circuit (writing driving scanning section) not shown in the figure. The operation of the Vcom driving circuit 9 can be considered to be equal to an "operation of moving a driving signal source S (see FIGS. 1A and 1B and FIGS. 2A and 2B) for performing simultaneous Vcom alternating-current driving of wiring of m counter electrodes in the column direction and scanning the selected counter electrodes in the column direction while changing the selected counter electrodes one by one."

Figure 14B:
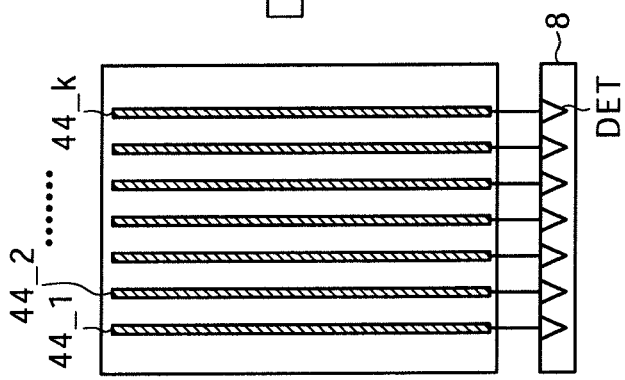
Figure 14C:
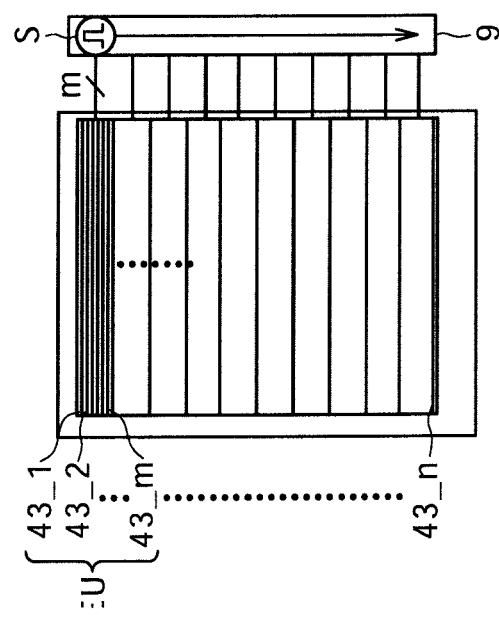

Incidentally, FIG. 14A and FIG. 14B are diagrams divided for the description of electrode patterns. In actuality, however, the counter electrodes 43_1 to 43.sub.--m and the detecting lines (detecting electrodes 44_1 to 44k) are arranged in such a manner as to overlap each other as shown in FIG. 14C, thus enabling position detection in a two-dimensional plane.

With this constitution, the detecting circuit 8 can detect a position in the row direction on the basis of which voltage detector DET shows a change in voltage, and obtain information on a position in the column direction on the basis of timing of the detection.

The shifting of counter electrodes 43 and alternating-current driving by the Vcom driving circuit 9 having the above driving signal source S as a basic constitution will next be described with reference to drawings.

Figure 15A:
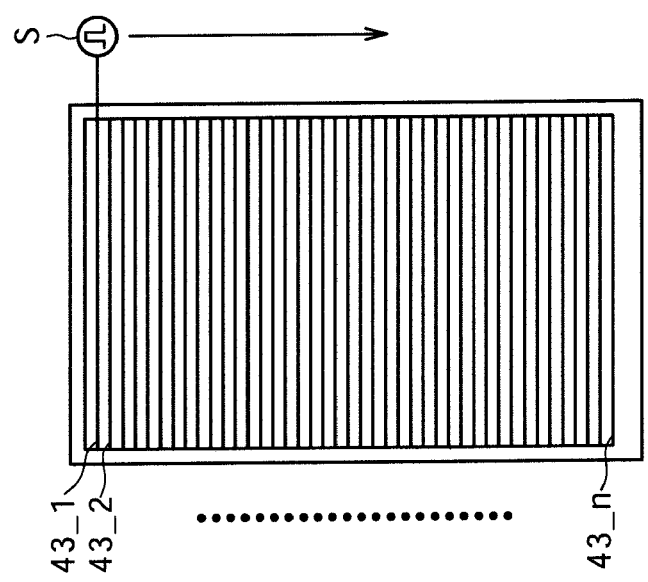
Figure 15B:
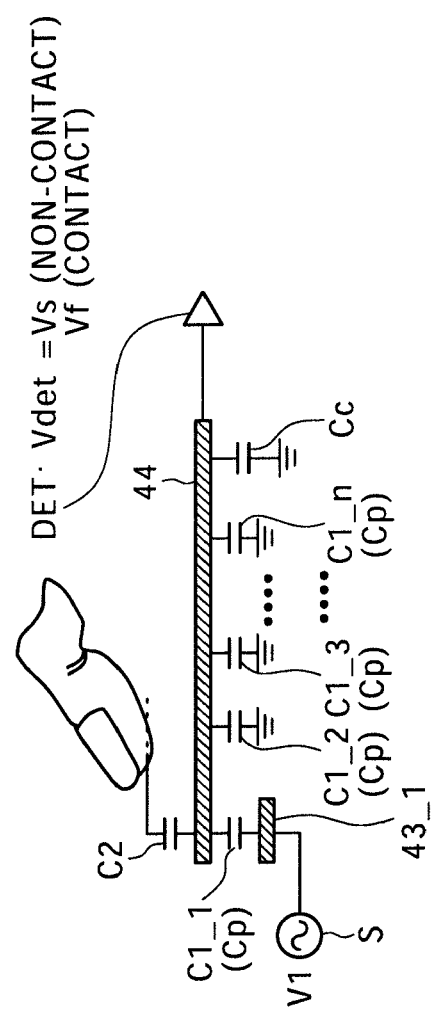

FIG. 15A shows the counter electrodes 43_1 to 43.sub.--n divided in pixel display line units (referred to also as writing units). FIG. 15B is a diagram of an equivalent circuit of a touch sensor section at a time of driving the counter electrode 43_1 as the first one of the counter electrodes 43_1 to 43.sub.--n.

As shown in FIG. 15A, the driving signal source S is connected to the counter electrode 43_1, and is performing Vcom alternating-current driving of the counter electrode 43_1. At this time, the touch sensor section has an equivalent circuit formed as shown in FIG. 15B, as already described. The capacitance value of each of capacitive elements C1_1 to C1.sub.--n is denoted by "Cp," a capacitive component (parasitic capacitance) connected to the detecting electrode 44 other than the capacitive elements C1_1 to C1.sub.--n is denoted by "Cc," and the effective value of alternating voltage of the driving signal source S is denoted by "V1."

A detection signal Vdet detected in the voltage detector DET at this time is a voltage Vs when a finger is not in contact, and is a voltage Vf when a finger is in contact. The voltages Vs and Vf will hereinafter be referred to as a sensor voltage.

The sensor voltage Vs at the time of non-contact is expressed by an equation as shown in FIG. 15C. This equation shows that when the number n of divisions of the counter electrode 43 is large, each capacitance value Cp is correspondingly decreased. While the denominator of the equation of FIG. 15C does not change very much because "nCp" is substantially fixed, the numerator is decreased. Thus, as the number n of divisions of the counter electrode 43 is increased, the magnitude (alternating-current effective value) of the sensor voltage Vs is decreased.

Therefore the number n of divisions cannot be made very large.

On the other hand, if the number n of divisions is small and the area of one counter electrode 43_1 is large, a slight potential variation (transient potential variation) when the Vcom alternating-current driving changes between electrodes is seen as a line on a display screen.

Accordingly, as described above, the present embodiment performs division itself in each pixel display line (writing unit), but performs simultaneous Vcom alternating-current driving of a plurality of counter electrodes. In addition, a part of the divided counter electrodes are selected two consecutive times. Thereby, a decrease in sensor voltage (decrease in S/N ratio) due to an increase in the number n of divisions and dilution (obscuring) of the potential variation at the time of electrode changes are achieved simultaneously.

FIGS. 16A, 16B, and 16C are diagrams of assistance in explaining the operation of the alternating-current driving and shifting.

Seven counter electrodes indicated by hatching in FIGS. 16A to 16C form an alternating-current driven electrode unit EU. FIGS. 16A to 16C show a change of selection ranges when the alternating-current driven electrode unit EU is shifted in units of one pixel line in the column direction.

At time T1 in FIG. 16A, while the first writing unit is not selected, the counter electrodes corresponding to the second to eighth lines are selected and subjected to simultaneous alternating-current driving by the driving signal source S. In a next cycle (time T2), a shift is performed by one writing unit, so that the two counter electrodes corresponding to the first and second lines are not selected, the seven electrodes from the third electrode on down are selected, and the others are not selected. Further, in a next cycle (time T3), a shift is further performed by one writing unit, so that the counter electrodes corresponding to the first to third lines are not selected, the seven electrodes from the fourth electrode on down are selected, and the others are not selected.

Thereafter the shifting and the alternating-current driving are similarly repeated.

This operation reduces the value n in the equation shown in FIG. 15C to $\frac{1}{7}$ of the real number of divisions, and correspondingly increases the effective value of the sensor voltage Vs. On the other hand, as shown in FIGS. 16A to 16C, a unit newly included in the selected group and a unit excluded in place of the newly included unit are one counter electrode corresponding to one pixel line. Thus, the changing frequency of the alternating-current driving is equal to the 1H inversion frequency of the common driving signal Vcom. This frequency is a very high frequency obtained by multiplying the frequency of commercial power, for example 60 [Hz] by the number of pixels in the column direction. When the number of pixels in the column direction is 480, for example, the frequency is 28.8 [kHz], and the frequency of a pulse waveform is half the frequency of 28.8 [kHz], that is, 14.4 [kHz]. Thus, image changes caused by shifts in the alternating-current driving have a sufficiently high frequency invisible to the eye of a human.

Thus, the prevention of a decrease in S/N ratio due to a decrease in sensor voltage and the prevention of a degradation in image quality due to changes in electrode driving are made compatible with each other.

The operation of the display device formed as described above will next be described.

The display driver (the horizontal driving circuit and the vertical driving circuit not shown in the figure or the like) of the driving substrate 2 supplies each electrode pattern (counter electrodes 43_1 to 43.sub.--n) of the counter electrode 43 with the common driving signal Vcom on a line-sequential basis. The manner of selecting counter electrodes and the manner of shifting at this time are as described above. The common driving signal Vcom is used also to control the potential of the counter electrodes for image display.

In addition, the display driver supplies a signal voltage to the pixel electrode 22 via the signal line SIG, and controls the switching of the TFT for each pixel electrode on a line-sequential basis via the scanning line SCN in synchronism with the supply of the signal voltage. Thereby, an electric field in a vertical direction (direction perpendicular to the substrates) which electric field is determined by the common driving signal Vcom and each pixel signal is applied to the liquid crystal layer 6 in each pixel, whereby a liquid crystal state in the liquid crystal layer 6 is modulated. Display is thus made by so-called inversion driving.

Meanwhile, on the side of the counter substrate 4, a capacitive element C1 is formed in each part of intersection of each electrode pattern (counter electrodes 43_1 to 43.sub.--n) of the counter electrode 43 and each electrode pattern (detecting electrodes 44_1 to 44.sub.--k) of the detecting electrode 44. When the common driving signal Vcom is sequentially applied to each electrode pattern of the counter electrode 43 on a time division basis, each of capacitive elements C1 of one row which capacitive elements C1 are formed in parts of intersection of the electrode pattern of the counter electrode 43 to which the common driving signal Vcom is applied and each electrode pattern of the detecting electrode 44 is charged or discharged. As a result, a detection signal Vdet of a magnitude corresponding to the capacitance value of the capacitive element C1 is output from each electrode pattern of the detecting electrode 44. In a state of a finger of a user not touching the surface of the counter substrate 4, the magnitude of the detection signal Vdet is substantially fixed (sensor voltage Vs). With the scanning of the common driving signal Vcom, the row of capacitive elements C1 to be charged or discharged moves on a line-sequential basis.

When the finger of the user touches a position of the surface of the counter substrate 4, a capacitive element C2 formed by the finger is added to the capacitive element C1 originally formed at the touch position. As a result, the value (sensor voltage Vs) of the detection signal Vdet at a point in time when the touch position is scanned becomes lower than that of other positions (the value becomes a sensor voltage Vf (<Vs)). The detecting circuit 8 (FIG. 5) compares the detection signal Vdet with a threshold value Vt, and determines that the position is a touch position when the detection signal Vdet is equal to or lower than the threshold value Vt. The touch position can be determined from timing of application of the common driving signal Vcom and timing of detection of the detection signal Vdet equal to or lower than the threshold value Vt.

Thus, according to the present embodiment, the common electrode (counter electrode 43) for liquid crystal driving which electrode is originally provided in a liquid crystal display element is used also as one (driving electrode) of a pair of electrodes for a touch sensor which electrodes are composed of the driving electrode and the detecting electrode. In addition, according to the present embodiment, the common driving signal Vcom as a display driving signal is shared as a touch sensor driving signal, whereby a capacitance type touch sensor is formed. Thus, only the detecting electrode 44 needs to be newly provided, and the touch sensor driving signal does not need to be newly provided. Therefore the constitution is simple.

In addition, a plurality of counter electrodes are simultaneously subjected to alternating-current driving, and the group of electrodes simultaneously subjected to alternating-current driving is shifted such that each counter electrode is selected at both of two times of alternating-current driving. Thus, the prevention of a decrease in S/N ratio of the detection voltage of the sensor and the prevention of a degradation in image quality are made compatible with each other.

Further, the driving electrode and the driving circuit for the common driving signal Vcom can be used also as the sensor driving electrode and driving circuit, so that arrangement space and power consumption can be correspondingly saved.

Incidentally, in FIGS. 4A to 4D and FIG. 6, the detecting electrode 44 is shown as a line of a small width. However, the detecting electrode 44 may be formed with a large width in the row direction. A case where the capacitance value of the capacitive element C1 is too small and is desired to be increased can be dealt with by increasing the electrode width. Conversely, a case where the capacitance value of the capacitive element C1 is too large because of a thin dielectric D, for example, and is desired to be decreased can be dealt with by decreasing the electrode width.

In addition, the identification of a region in the foregoing first to fourth embodiments is also made possible by changing the width of the detecting electrode 44 (detecting line E2) in the regions.

In the fifth embodiment, the group of counter electrodes driven simultaneously (alternating-current driven electrode unit EU) is shifted by each pitch of divided counter electrodes. However, the present invention is not limited to this.

Further, in the sectional structure, the detecting electrode 44 may be formed at a position such that the detecting electrode 44 is opposed to the counter electrode 43 with the color filter 42 interposed between the detecting electrode 44 and the counter electrode 43.

Sixth Embodiment

A sixth embodiment will next be described. Unlike the fifth embodiment, the present embodiment uses a liquid crystal element in a transverse electric field mode as a display element.

FIG. 17 is a schematic sectional view of a structure of a display device according to the present embodiment. In FIG. 17, the same constitutions as in the fifth embodiment are identified by the same reference numerals, and description thereof will be omitted as appropriate.

As far as the position of electrodes is concerned (patterns are different), the display device according to the present embodiment is different from the fifth embodiment in that a counter electrode 43 is disposed on the side of a driving substrate 2. The counter electrode 43 in the present embodiment is disposed so as to be opposed to pixel electrodes 22 on an opposite side of the pixel electrodes 22 from a liquid crystal layer 6. While the word "opposite" is used, though not specifically shown in the figure, a relatively long distance between the pixel electrodes 22 is secured, and the counter electrode 43 makes an electric field act on the liquid crystal layer 6 from between the pixel electrodes 22. That is, liquid crystal display in the transverse electric field mode in which the direction of the electric field acting on the liquid crystal layer 6 is a horizontal direction is made.

The other constitutions of the sixth embodiment and the fifth embodiment are the same as long as arrangement in section is concerned.

Figure 14D:
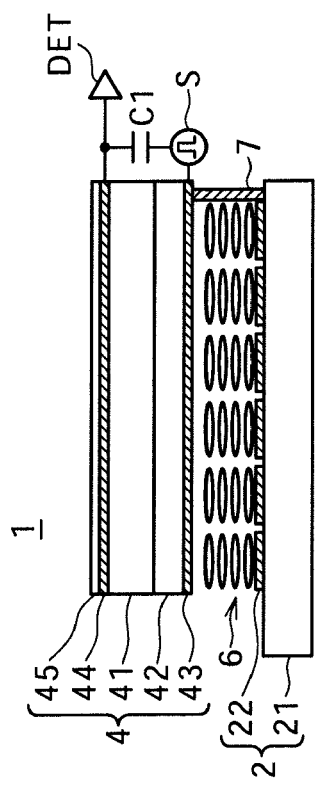

A capacitive element C1 is formed between a detecting electrode 44 and the counter electrode 43, and thus has a lower capacitance value than in the fifth embodiment (FIG. 14D). However, such a measure as compensating for an increase in electrode interval by increasing electrode width, for example, can be taken, and sensitivity may be increased in relation to a capacitive element C2.

The liquid crystal layer 6 modulates light passing through the liquid crystal layer 6 according to the state of the electric field. A liquid crystal in the transverse electric field mode such for example as an FFS (Fringe Field Switching) mode or an IPS (In-Plane Switching) mode is used as the liquid crystal layer 6.

More detailed description will next be made with reference to FIGS. 18A and 18B.

In the liquid crystal element in the FFS mode shown in FIGS. 18A and 18B, the pixel electrode 22 patterned into a comb-tooth shape is disposed over the counter electrode 43 formed on the driving substrate 2 via an insulating layer 25, and an alignment film 26 is formed so as to cover the pixel electrodes 22. The liquid crystal layer 6 is sandwiched between the alignment film 26 and an alignment film 46 on the side of a counter substrate 4. Two polarizers 24 and 45 are disposed in a crossed-Nicol state. The rubbing direction of the two alignment films 26 and 46 coincides with the transmission axis of one of the two polarizers 24 and 45. FIGS. 18A and 18B show a case where the rubbing direction coincides with the transmission axis of a protective layer 45 on an emitting side. Further, the rubbing direction of the two alignment films 26 and 46 and the direction of the transmission axis of the protective layer 45 are set substantially parallel to the extending direction of the pixel electrodes 22 (direction of length of the comb teeth) in a range in which the direction of rotation of liquid crystal molecules is defined.

The operation of the display device formed as described above will next be described.

Principles of display operation of the liquid crystal element in the FFS mode will first be described briefly with reference to FIGS. 18A and 18B and FIGS. 19A and 19B. FIGS. 19A and 19B show a section of principal parts of the liquid crystal element in an enlarged state. Of these figures, FIGS. 18A and 19A show a state of the liquid crystal element at a time of non-application of an electric field, and FIGS. 18B and 19B show a state of the liquid crystal element at a time of application of an electric field.

In a state in which no voltage is applied between the counter electrode 43 and the pixel electrodes 22 (FIG. 18A and FIG. 19A), the axis of the liquid crystal molecules 61 forming the liquid crystal layer 6 is orthogonal to the transmission axis of the polarizer 24 on an incidence side, and is parallel to the transmission axis of the protective layer 45 on the emitting side. Therefore, incident light h that has passed through the polarizer 24 on the incidence side reaches the protective layer 45 on the emitting side without a phase difference occurring within the liquid crystal layer 6, and is absorbed in the protective layer 45, thus resulting in black display. On the other hand, in a state in which a voltage is applied between the counter electrode 43 and the pixel electrodes 22 (FIG. 18B and FIG. 19B), the direction of alignment of the liquid crystal molecules 61 is rotated to an oblique direction with respect to the extending direction of the pixel electrodes 22 by a transverse electric field E occurring between the pixel electrodes 22. The intensity of the electric field at a time of white display is optimized such that the liquid crystal molecules 61 positioned at the center of the liquid crystal layer 6 in the direction of thickness of the liquid crystal layer 6 are rotated by about 45 degrees at this time. Thereby, a phase difference occurs in the incident light h that has passed through the polarizer 24 on the incidence side while the incident light h passes through the inside of the liquid crystal layer 6, and the incident light h becomes linearly polarized light rotated by 90 degrees and passes through the protective layer 45 on the emitting side, thus resulting in white display.

Incidentally, as for a touch sensor section, only the electrode arrangement in the sectional structure is different, and basic operation is the same as in the first to fourth embodiments. Specifically, the counter electrode 43 is driven in a column direction by repeating Vcom alternating-current driving and shifting, and a difference between sensor voltages Vs and Vf at this time is read via a voltage detector DET. The sensor voltage Vs read as a digital value is compared with a threshold value Vt, and the position of contact or proximity of a finger is detected in the form of a matrix.

At this time, as in the first embodiment, as shown in FIGS. 16A to 16C, m counter electrodes 43 (m=7 in FIGS. 16A to 16C) are simultaneously subjected to alternating-current driving, and are shifted by one counter electrode 43 corresponding to one writing unit. Then alternating-current driving is performed again. This shifting and alternating-current driving are repeated. Thus, the value n in the equation shown in FIG. 15C is reduced to 1/m of the real number of divisions, and the sensor voltage Vs is correspondingly increased. On the other hand, as shown in FIGS. 16A to 16C, a unit newly included in the selected group and a unit excluded in place of the newly included unit are one counter electrode corresponding to one pixel line. Thus, the changing frequency of the alternating-current driving is equal to the 1H inversion frequency of the common driving signal Vcom. This frequency is a very high frequency obtained by multiplying the frequency of commercial power, for example 60 [Hz] by the number of pixels in the column direction. When the number of pixels in the column direction is 480, for example, the frequency is 28.8 [kHz], and the frequency of a pulse waveform is half the frequency of 28.8 [kHz], that is, 14.4 [kHz], which is a sufficiently high frequency invisible to the eye of a human.

Thus, the prevention of a decrease in S/N ratio due to a decrease in sensor voltage and the prevention of a degradation in image quality due to changes in electrode driving are made compatible with each other.

In addition to the above effects, as in the fifth embodiment, there is an advantage of a simple constitution as a result of sharing an electrode for Vcom driving and sensor driving. Further, the driving electrode and the driving circuit for the common driving signal Vcom can be used also as sensor driving electrode and driving circuit, so that arrangement space and power consumption can be correspondingly saved.

The present application contains subject matter related to that disclosed in Japanese Priority Patent Application JP 2008-236931 filed in the Japan Patent Office on Sep. 16, 2008, the entire content of which is hereby incorporated by reference.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:
1. A display device comprising:
   a plurality of pixels arranged in a first direction and a second direction;
   a contact responding section configured to produce an electric change in response to an object to be detected coming into contact with or proximity to a detecting surface, the contact responding section including a plurality of driving electrodes extending in the first direction;
   a driving scanning section configured to scan application of a driving voltage to individual ones of the plurality of driving electrodes in the second direction or a direction opposite to the second direction;
   a plurality of detecting lines extending in the second direction such that each of the plurality of detecting lines intersects the driving electrodes; and
   a detecting section configured to detect occurrence of the electric change from a voltage change in at least one of the plurality of detecting lines to identify a position of the occurrence,
   wherein
   the driving electrodes include at least one first drive electrode and at least one second drive electrode,
   a first voltage is applied to the at least one first drive electrode, a second voltage, which is different from the first voltage, is applied to the at least one second drive electrode that is other than the at least one first drive electrode, and the detecting section identifies the position in which the object to be detected is in contact or in proximity on a basis of a pattern of the voltage change of the detecting lines, the pattern of the voltage change occurring according to a difference in the manner of the intersecting between the detecting lines and the driving electrodes.

2. The display device according to claim 1, wherein the plurality of detecting lines include a first and second sets of detecting lines extending in the second direction and being in a form of parallel stripes; and the detecting section connected to the first and second sets of detecting lines, respectively, a first detecting section and a second detecting section each detecting occurrence of the electric change on a basis of a voltage change pattern occurring in the detecting lines of a corresponding set and identifying a position of the occurrence.

3. The display device according to claim 1, wherein the contact responding section is formed by arranging sensors in a plane parallel to the detecting surface in a form of a matrix, and the driving scanning section performs scanning with a line of the matrix in the first direction as a minimum unit.

4. The display device according to claim 1, wherein the contact responding section is formed by arranging sensors in a plane parallel to the detecting surface in a form of a matrix, and the driving scanning section performs scanning with a predetermined number of consecutive lines of the matrix in the first direction as a minimum unit.

5. The display device according to claim 1, wherein the contact responding section is formed by arranging sensors in a plane parallel to the display surface in a form of a matrix, and the driving scanning section performs scanning with a predetermined number of consecutive lines of the matrix in the first direction as a minimum unit.

6. A display device comprising:

a plurality of pixels arranged in a first direction and a second direction;

a touch panel including a first area and a second area that is adjacent to the first area in the second direction;

a plurality of first detecting lines arranged in the first area;

a plurality of second detecting lines arranged in the second area;

a plurality of driving lines arranged to intersect the first detecting lines in the first area and the second detecting lines in the second area, wherein an area boundary between the first area and the second area is along the driving lines in a plan view;

a scan driving circuit configured to supply a scan driving signal to the driving lines, the scan driving signal being a signal that is also used for display driving of a display of the touch detecting device in generating image information for the display; and a detecting section to detect a touch, based on a signal detected from one or both of the first detecting lines and the second detecting lines, wherein the scan driving circuit, upon starting the display driving that includes writing for the display in the first area, performs a plurality of contact driving scans of the first and second areas in parallel by simultaneously supplying the scan driving signal that is an alternating voltage pulse signal having a predetermined frequency to the corresponding driving lines in the first area and the second area in parallel, without performing any display driving for the display in the second area.

* * * * *